US010456862B2

(12) United States Patent
Nagae

(10) Patent No.: US 10,456,862 B2
(45) Date of Patent: Oct. 29, 2019

(54) PLATE PROCESSING SYSTEM AND PLATE PROCESSING METHOD

(71) Applicant: MURATA MACHINERY, LTD., Kyoto-shi, Kyoto (JP)

(72) Inventor: Masayuki Nagae, Inuyama (JP)

(73) Assignee: MURATA MACHINERY, LTD., Kyoto (JP)

( * ) Notice: Subject to any disclaimer, the term of this patent is extended or adjusted under 35 U.S.C. 154(b) by 720 days.

(21) Appl. No.: 15/040,035

(22) Filed: Feb. 10, 2016

(65) Prior Publication Data

US 2016/0256956 A1    Sep. 8, 2016

(30) Foreign Application Priority Data

Mar. 3, 2015    (JP) ................................ 2015-041176
May 26, 2015    (JP) ................................ 2015-106149

(51) Int. Cl.
*B23K 26/00* (2014.01)
*B23K 26/356* (2014.01)
*B23K 26/08* (2014.01)

(52) U.S. Cl.
CPC ................................ *B23K 26/083* (2013.01)

(58) Field of Classification Search
CPC    B23K 26/083; B23K 37/047; B23K 26/0884; B23K 26/38; B23K 26/398
USPC ............ 219/121.67, 121.68, 121.71, 121.82, 219/121.76
See application file for complete search history.

(56) References Cited

U.S. PATENT DOCUMENTS

| 4,802,567 A * | 2/1989 | Ikeda ................... B21D 43/003 198/345.1 |
| 5,192,848 A | 3/1993 | Miyakawa et al. |
| 5,304,773 A * | 4/1994 | Kilian ................... B23K 26/04 219/121.78 |
| 2013/0277343 A1* | 10/2013 | Finn ................... B23K 26/0838 219/121.72 |
| 2014/0298961 A1* | 10/2014 | Walz ...................... B23B 3/168 82/121 |

FOREIGN PATENT DOCUMENTS

| FR | 2780671 A1 * | 1/2000 | ............ B23K 26/10 |
| JP | 10-137868 A | 5/1998 | |

(Continued)

OTHER PUBLICATIONS

English_Translation_of_FR2780671.pdf; Moreau Jean Louis; Date: 2000.*

*Primary Examiner* — Michael G Hoang
*Assistant Examiner* — Tiffany T Tran
(74) *Attorney, Agent, or Firm* — Keating & Bennett, LLP

(57) ABSTRACT

A compact system that accurately process a workpiece includes a first processing device including a laser head that moves with respect to a plate-shaped workpiece in a first processing region to process the workpiece, a fork device that supports the workpiece in the first processing region, a transfer device that holds and transfers the workpiece supported by the fork device, and a second processing device including a processing tool that moves in a direction intersecting a transfer direction of the workpiece in a second processing region and processes the workpiece, the second processing region being located in a portion of a transfer path of the workpiece transferred by the transfer device.

17 Claims, 20 Drawing Sheets

(56) References Cited

FOREIGN PATENT DOCUMENTS

| JP | 11-129132 A | | 5/1999 |
|----|-------------|---|--------|
| JP | 2004291056 A | * | 10/2004 |
| JP | 4288091 B2 | | 7/2009 |

* cited by examiner

PLATE PROCESSING SYSTEM AND PLATE PROCESSING METHOD

BACKGROUND OF THE INVENTION

1. Field of the Invention

The present invention relates to a plate processing system and a plate processing method.

2. Description of the Related Art

Punching or forming a workpiece using a punch press machine is known. In the punching or forming processes, the following operation is repeated: a portion of the workpiece to be processed is positioned at a punch position and the portion is processed, and then the workpiece is moved so as to position a next portion to be processed and the next portion is processed. Also, cutting a workpiece using a laser machine is known. The laser machine cuts the workpiece by moving a laser head while irradiating the workpiece, held at a predetermined position, with a laser beam. There is known a plate processing system incorporating the punch press machine and the laser head, as one processing machine, to form and cut a workpiece (Refer to, for example, Japanese Unexamined Patent Publication No. 10-137868).

A recently used laser beam having a high thermal density, such as a fiber laser, can cut the workpiece, even when the laser head moves at high speed. However, with the configuration described in Japanese Unexamined Patent Publication No. 10-137868, since the workpiece is moved with respect to the fixed laser head, the advantage of high-speed cutting laser cannot be sufficiently utilized. For example, it is considered to process the workpiece by use of separate punch press machine and laser machine. In this case, it takes time to transfer the workpiece between the punch press machine and the laser machine. In addition, passing of the workpiece between the machines tends to cause displacement of the workpiece, lowering the processing accuracy. The plate processing system including a plurality of processing machines, such as the punch press machine and the laser machine, becomes larger as a whole, requiring a large installation space. For this reason, there is a demand for a compact plate processing system.

SUMMARY OF THE INVENTION

In consideration of such circumstances, preferred embodiments of the present invention provide a plate processing system and a plate processing method which accurately perform composite processing such as forming while utilizing the advantage of cutting with the moving laser head, as well as achieve downsizing as a whole to make the installation space smaller.

A plate processing system according to a preferred embodiment of the present invention includes a first processing device including a laser head that moves relatively with respect to a plate-shaped workpiece disposed in a first processing region to process the workpiece; a support device that supports the workpiece disposed in the first processing region; a transfer device that holds and transfers the workpiece supported by the support device; and a second processing device including a processing tool that moves in a direction intersecting a transfer direction of the workpiece in a second processing region and processes the workpiece, the second processing region being located in a portion of a transfer path of the workpiece transferred by the transfer device.

The plate processing system may further include a table located opposite to the first processing region across the second processing region, the table on which the workpiece transferred by the transfer device is placed, and the transfer device may transfer the workpiece placed on one or both of the support device and the table. The plate processing system may further include a movable palette, on which the workpiece is placed, in the first processing region, and the support device may move relatively with respect to the palette, and raise and support the workpiece. The support device may be a fork device including a plurality of arm portions that advance/retract with respect to the first processing region from a standby region partially surrounding the first processing region, the plurality of arm portions on which the workpiece is placed. The fork device may advance/retract with respect to the first processing region from the standby region and through the second processing region, and the transfer device may transfer the workpiece in an advancing/retracting direction of the arm portions. The second processing device may include a frame having an opening through which the workpiece, the fork device, and a portion of the transfer device pass, and a guide provided on the frame, the guide being that moves the processing tool in the intersecting direction. The guide may have an upper guide and a lower guide which are located on opposite sides of the opening, and the processing tool may include an upper-tool support block that moves along the upper guide and holds a plurality of upper tools, a lower-tool support block that moves along the lower guide and holds a plurality of lower tools, and a forming head that selects and uses any of the plurality of upper tools and the plurality of lower tools. The plurality of upper tools and the plurality of lower tools may be arranged parallel or substantially parallel to the intersecting direction. The upper-tool support block and the lower-tool support block may move in synchronization with each other. The forming head may be movable along the upper guide or the lower guide, or may be movable along a selection guide located on the upper-tool support block or the lower-tool support block.

The second processing device may include a position detector that detects a position of the processing tool in the intersecting direction. The plate processing system may further include a fixing table in the standby region, the fixing table including a plurality of rod portions which are alternately disposed with the arm portions of the fork device and extend in the advancing/retracting direction. Upper surfaces of the arm portions of the fork device may be set flush with upper surfaces of the rod portions of the fixing table. The plate processing system may further include a support table in the standby region, the support table supporting the workpiece on an upper surface and retracting downward, and the fork device may include an advance/retract driver that is capable of advancing/retracting with respect to the first processing region when the support table retracts, and capable of being separated from the arm portions. The plate processing system may further include a movable palette on which the workpiece is placed, and the palette may move in a direction intersecting the advancing/retracting direction of the arm portions to carry the workpiece into and out of the first processing region. The support device may extend upward in the first processing region or rotate to a standing position, to support the workpiece. The support device may horizontally extend from a periphery of the first processing region toward the first processing region, to support the workpiece.

A plate processing method according to a preferred embodiment of the present invention is a plate processing method of processing a plate-shaped workpiece including relatively moving the workpiece and a laser head in a first processing region to process the workpiece with the laser head; supporting the workpiece disposed in the first processing region; holding and transferring the supported workpiece; and moving a processing tool in a direction intersecting a transfer direction of the workpiece in a second processing region to process the workpiece, the second processing region being located in a portion of a transfer path of the workpiece.

According to various preferred embodiments of the present invention, a workpiece is able to be efficiently processed using the laser head of the first processing device and the processing tool of the second processing device. Since the processing tool moves in the direction intersecting the transfer direction of the workpiece, the processing tool is easily disposed at any position of the workpiece. By moving the laser head, the workpiece is processed at high speed. Since the table, on which the workpiece transferred by the transfer device is placed, is provided opposite to the first processing region across the second processing region, and the transfer device transfers the workpiece placed on one or both of the support device and the table, the workpiece placed on the support device and the table are stably transferred. Since the movable palette, on which the workpiece is placed, is provided in the first processing region, and the support device moves relatively with respect to the palette to raise and support the workpiece, the workpiece is easily supported by the support device. Since the support device includes the fork device including the plurality of arm portions that advance/retract with respect to the first processing region from the standby region partially surrounding the first processing region, the plurality of arm portions on which the workpiece is placed, the fork device reliably supports the workpiece. Since the fork device advances/retracts with respect to the first processing region from the standby region and through the second processing region, and the transfer device transfers the workpiece in the advancing/retracting direction of the arm portions, the transfer device is able to transfer the workpiece using the standby region of the fork device, making the entire system compact.

Since the second processing device includes the frame having the opening through which the workpiece, the fork device, and a portion of the transfer device pass, and the guide provided on the frame, and the guide moves the processing tool in the intersecting direction, the position of the workpiece passing through the opening and the position of the processing tool moving along the guide enable arrangement of the processing tool at any position of the workpiece. Since the guide includes the upper guide and the lower guide which are located on opposite sides of the opening, and the processing tool includes the upper-tool support block that moves along the upper guide and holds the plurality of upper tools, the lower-tool support block that moves along the lower guide and holds the plurality of lower tools, and the forming head that selects and uses any of the plurality of upper tools and the plurality of lower tools, the upper-tool support block and the lower-tool support block include the upper tools and the lower tools, respectively, and any tool is able to be selected to easily change the processing tool. Since the upper tools and the lower tools preferably are arranged parallel or substantially parallel to the intersecting direction, the upper tools and the lower tools are easily disposed and selected. Since the upper-tool support block and the lower-tool support block move in synchronization with each other, the upper tools held by the upper-tool support block and the lower tools held by the lower-tool support block are easily positioned. Since the forming head is movable along the upper guide, the lower guide, or the selection guide provided in the upper-tool support block or the lower-tool support block, the forming head moves along the guide or the selection guide so that the upper tool and the lower tool to be used for processing is easily selected.

Since the second processing device includes the position detector that detects the position of the processing tool in the intersecting direction, the position detector is able to detect the position of the processing tool, thus accurately disposing the processing tool at a desired position of the workpiece. Since the system includes the fixing table including the plurality of rod portions that extend in the advancing/retracting direction, the rod portions and the arm portions of the fork device being alternately disposed in the standby region, the plurality of rod portions support the workpiece while preventing interference with the arm portions of the fork device and therefore, the workpiece is able to be stably processed by the second processing device. Since the upper surfaces of the arm portions of the fork device are set flush with the upper surfaces of the rod portions of the fixing table, damage caused to the lower surface of the workpiece transferred by the transfer device is prevented. Since the system includes the support table in the standby region, and the support table supports the workpiece on the upper surface and retracts downward, and the fork device includes the advance/retract driver which is capable of advancing/retracting with respect to the first processing region when the support table retracts, and capable of being separated from the arm portions, the workpiece is supported by the support table so that the workpiece is stably processed by the second processing device, and further, the support table retracts downward so that the fork device smoothly advances/retracts. Since the movable palette, on which the workpiece is placed, moves in the direction intersecting the advancing/retracting direction of the arm portions to carry the workpiece into and out of the first processing region, the workpiece is easily carried into and out of the first processing region while keeping the entire system compact. Since the support device extends upward in the first processing region or rotate to a standing position, to support the workpiece, the workpiece in the first processing region is easily supported with a simple configuration. Since the support device horizontally extends from a periphery of the first processing region toward the first processing region to support the workpiece, the workpiece in the first processing region is easily supported with a simple configuration.

In the plate processing method according to a preferred embodiment of the present invention, since the second processing region is located in a portion of the transfer path of the workpiece from the first processing region, the workpiece is able to be efficiently processed by processing the workpiece in the second processing region during transfer of the workpiece from the first processing region. Since the processing tool moves in the direction intersecting with the transfer direction of the workpiece, the processing tool is easily disposed at any position of the workpiece. The workpiece is processed at high speed by moving the laser head.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 3A is a perspective view, and FIG. 3B is a sectional view taken along line A-A in FIG. 3A.

FIG. 16A illustrates the state before a workpiece is supported, and FIG. 16B illustrates the state after the workpiece is supported.

FIG. 17A illustrates the state before the workpiece is supported, and FIG. 17B illustrates the state after the workpiece is supported.

FIG. 18A illustrates the state before the workpiece is supported, FIG. 18B illustrates preparation for supporting the workpiece, and FIG. 18C illustrates the state after the workpiece is supported.

FIG. 19A is a plan view, and FIG. 19B is a side view.

FIG. 20A is a plan view, and FIG. 20B is a side view.

DETAILED DESCRIPTION OF THE PREFERRED EMBODIMENTS

Figure 1:
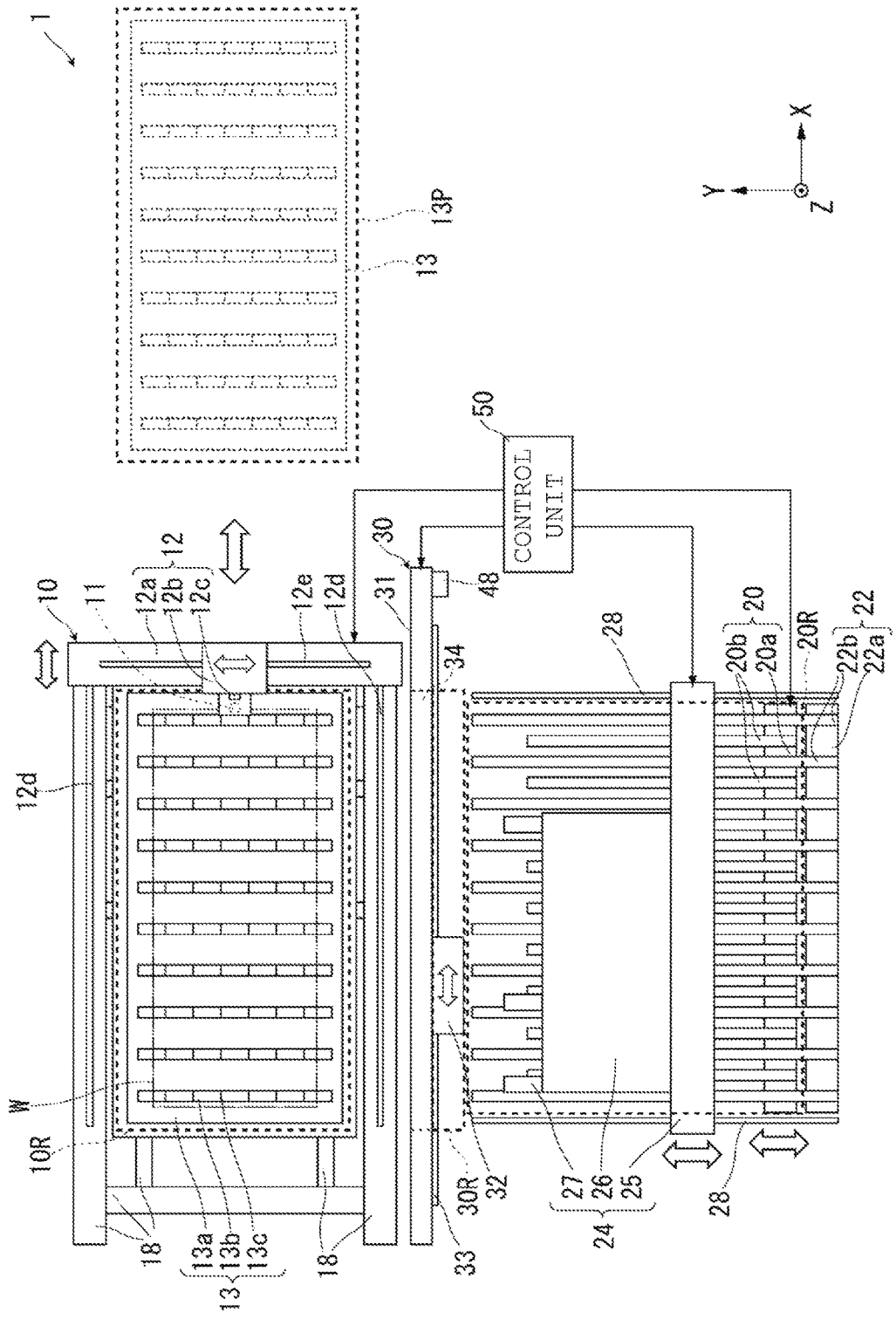
FIG. 1 is a plan view illustrating an example of a plate processing system according to a preferred embodiment of the present invention.

Preferred embodiments of the present invention will be described below with reference to the drawings. However, the present invention is not limited thereto. To describe the preferred embodiments, components in the drawings are partially enlarged or emphasized as appropriate. Directions in the drawings are expressed using an XYZ coordinate system. In the XYZ coordinate system, a plane parallel to a horizontal plane is defined as an XY plane. A direction parallel to the XY plane is expressed as an X direction, and a direction orthogonal to the X direction is defined as a Y direction. An advancing/retracting direction of below-described arm portions 20b (transfer direction of a workpiece W) is defined as the Y direction. A direction perpendicular to the XY plane is defined as a vertical direction or a Z direction. Herein, upward is +Z direction and downward is −Z direction. In each of the X direction, the Y direction, and the Z direction, the direction of the arrow in each figure is + direction, and the direction opposite to the direction of the arrow is − direction.

Figure 2:
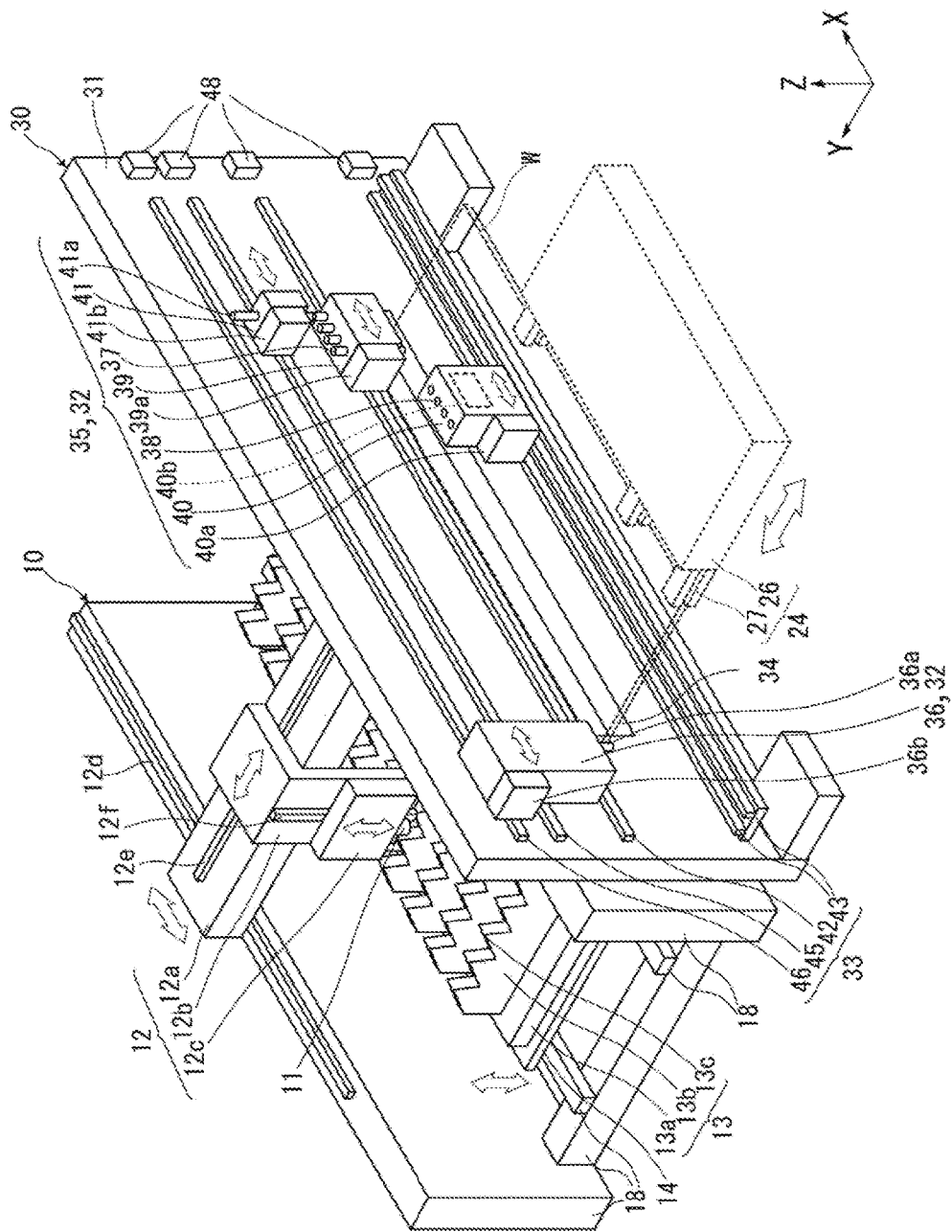
FIG. 2 is a perspective view illustrating an example of a first processing device and a second processing device.

FIG. 1 is a plan view illustrating an example of a plate processing system 1 according to a preferred embodiment of the present invention viewed from above. FIG. 2 is a perspective view illustrating the example of the plate processing system 1 according to the present preferred embodiment. As illustrated in FIG. 1 and FIG. 2, the plate processing system 1 performs a plurality of types of processing including cutting, forming, tapping, and punching on, for example, a workpiece W that is a metal rectangular plate, for example. In this preferred embodiment, the plate processing system 1 which cuts and forms the workpiece W is described by way of example. The plate processing system 1 includes a first processing device 10, a fork device (support device) 20, a transfer device 24, a second processing device 30, and a controller 50 that collectively controls these devices.

The first processing device 10 is a laser machine that cuts the workpiece W into a product of desired shape by application of a laser beam. The first processing device 10 includes a laser head 11 and a head driver 12. The laser head 11 includes an emitting portion (not illustrated) that emits the laser beam downward. The laser head 11 is connected to a laser light source (not illustrated) via an optical transmission member such as an optical fiber (not illustrated). Examples of the laser light source include a solid laser light source such as fiber laser. The solid laser has a higher thermal density than carbon dioxide gas laser and the like, enabling cutting at high speed.

The laser head 11 is able to be moved relatively with respect to the workpiece W in the X direction, the Y direction, and the Z direction by the head driver 12. A range in which the laser head 11 moves in the X direction and the Y direction is set as a first processing region 10R. The workpiece W disposed in the first processing region 10R is able to be processed by moving the laser head 11 at high speed.

The head driver 12 includes a gantry 12a, a slider 12b, and an elevator 12c. The gantry 12a is disposed along the Y direction and on a pair of guide rails 12d. The pair of guide rails 12d are located on opposite sides of a frame 18 across the first processing region 10R in the Y direction so as to be parallel or substantially parallel to each other along the X direction. The head driver 12 includes a driving mechanism (not illustrated) such as a ball screw mechanism to move the gantry 12a in the X direction. The gantry 12a is movable along the guide rails 12d in the X direction by the driving mechanism.

A guide 12e is provided on an upper surface (+Z side surface) of the gantry 12a. The guide 12e extends along the Y direction, and guides the slider 12b. The slider 12b is disposed over the upper surface and a −X side surface of the gantry 12a. The head driver 12 includes a driving mechanism (not illustrated) such as a ball screw mechanism that moves the slider 12b in the Y direction. The slider 12b is able to be moved along the guide 12e in the Y direction by the driving mechanism. A guide that guides the slider 12b may be provided on the −X side surface of the gantry 12a.

A guide 12f is provided on a −X side surface of the slider 12b. The guide 12f extends along the vertical direction, and guides the elevator 12c. The elevator 12c is disposed on the −X side surface of the slider 12b. The head driver 12 includes a driving mechanism (not illustrated) such as a ball screw mechanism that moves the elevator 12c in the vertical direction. The elevator 12c is able be moved along the guide 12f in the vertical direction by the driving mechanism.

The laser head 11 is held at the elevator 12c. The gantry 12a moves in the X direction, so that the laser head 11, the slider 12b, and the elevator 12c integrally move in the X direction. The slider 12b moves in the Y direction, so that the laser head 11 and the elevator 12c integrally move in the Y direction. The elevator 12c moves in the vertical direction, so that the laser head 11 moves in the vertical direction. Thus, the laser head 11 is able to move above the first processing region 10R in the X direction, the Y direction, and the Z direction. The head driver 12 is not limited to the above configuration. For example, a robot arm may move the laser head 11 in the X, Y, and Z directions. Instead of moving the laser head 11, the workpiece W may be moved, or both the laser head 11 and the workpiece W may be moved.

A palette 13 is disposed in the first processing region 10R. The palette 13 is moved between a position 13P and a first processing region 10R by a moving device (not illustrated). The palette 13 has the workpiece W placed thereon, and carries the workpiece W into and out of the first processing region 10R. The palette 13 also functions as a table that supports the workpiece W in the first processing region 10R. The palette 13 is mounted on a mounting portion 14 of the frame 18. The mounting portion 14 may be provided with a positioning portion that positions the palette 13. The mounting portion 14 can be moved in the vertical direction by a driving device (not illustrated). The mounting portion 14 is movable in the vertical direction with the palette 13 being mounted on the mounting portion 14, thus moving the palette 13 downward, for example.

As illustrated in FIG. 1 and FIG. 2, the palette 13 includes a base plate 13a and a plurality of support plates (workpiece support portions) 13b. The support plates 13b are arranged in a standing position on an upper surface of a rectangular base plate 13a, side by side in the X direction, and support a lower surface of the workpiece W at their upper ends. A distance between the two adjacent support plates 13b is set to receive the arm portion 20b of the fork device 20 to be described later. An opening (not illustrated) is provided in a Y-side standing portion of the frame 18, and similar to an opening 34 of a frame 31 of the below-described second processing device 30, has a structure such that the workpiece W, a portion of the transfer device 24, and the fork device 20 can pass therethrough. The support plates 13b each include, for example, a plurality of saw-tooth upper ends 13c. The upper ends 13c preferably have a same height from the base plate 13a (position in the Z direction).

The workpiece W is placed on the plurality of upper ends 13c. Since the plurality of upper ends 13c preferably have the same height or substantially the same height, the workpiece W is placed horizontally or substantially horizontally. Due to the saw-tooth shape, a contact area of the upper ends 13c and the workpiece W is small. This prevents the workpiece W from being welded to the support plates 13b during processing, facilitating separation of the workpiece W from the support plates 13b using the below-described fork device 20. The shape of the upper ends 13c is not limited to saw-tooth shape, but may have a pin holder shape or a wave-like shape. The palette 13 does not necessarily have the plurality of support plates 13b, and a plurality of pins may be arranged on the base plate 13a.

The palette 13 is carried from the outside (for example, the position 13P) in the −X direction, with the workpiece W placed on the upper ends 13c of the support plates 13b, and then, with the workpiece W placed thereon, the palette 13 is disposed in the processing region of the first processing device 10. The palette 13 is carried to the outside (for example, the position 13P) in the +X direction, with the processed workpiece W placed thereon. That is, the palette 13 reciprocates between the first processing device 10 and the outside. Carrying-in and carrying-out of the workpiece W is able to be performed using an external loader (not illustrated) and the like.

The fork device 20 includes a base portion 20a and the arm portions 20b. The base portion 20a extends in the X direction. The arm portions 20b are each a rod extending from the base portion 20a in the +Y direction. The arm portions 20b are provided, on an upper surface of the base portion 20a, side by side in the X direction. When the fork device 20 moves in the +Y direction, each of the arm portions 20b enter between the adjacent support plates 13b in the +Y direction. The arm portions 20b are arranged in the X direction at the same or substantially the same pitch as the pitch of the support plates 13b. Brushes (not illustrated) are provided on the upper surfaces of the respective arm portions 20b at predetermined intervals. The brushes are made of a material such as resin, for example, and the brushes support the workpiece W during transfer of the workpiece W. The brushes reduce a resistance during transfer of the workpiece W to prevent damages caused on the lower surface of the workpiece W. Provision of the brushes is optional. Instead of the brushes, a plurality of free ball bearings (i.e., balls that can roll in all directions) may be provided.

The fork device 20 includes a driving device (not illustrated) and a guide (not illustrated), and cause the arm portions 20b to advance and retract between a standby region 20R and the first processing region 10R. The standby region 20R is a portion of a region surrounding the first processing region 10R. The advancing/retracting direction of the arm portions 20b is set to the Y direction. The standby region 20R includes a region where at least the arm portions 20b move in the −Y direction and are separated from a below-described second processing region 30R. The standby region 20R is located opposite to the first processing device 10 (the first processing region 10R) across the second processing device 30. The base portion 20a and the arm portions 20b are able to move from the standby region 20R, beyond the second processing region 30R, and into the first processing region 10R.

A fixing table 22 extends from the standby region 20R to the second processing region 30R. The fixing table 22 includes a rod-shaped support portion 22a extending in the X direction, and a plurality of rod portions 22b extending from the support portion 22a in the +Y direction. The plurality of rod portions 22b are arranged along the X direction at a regular pitch in the X direction. The pitch of the plurality of rod portions 22b in the X direction is the same or substantially the same as the pitch of the arm portions 20b of the fork device 20 in the X direction. Similar to the arm portions 20b of the fork device 20, upper surfaces of the rod portions 22b are each provided with a brush or free ball bearing which are not illustrated, thus supporting the workpiece W during transfer of the workpiece W, and reducing a resistance during transfer of the workpiece W to prevent damages caused on the lower surface of the workpiece W.

Figure 3A:
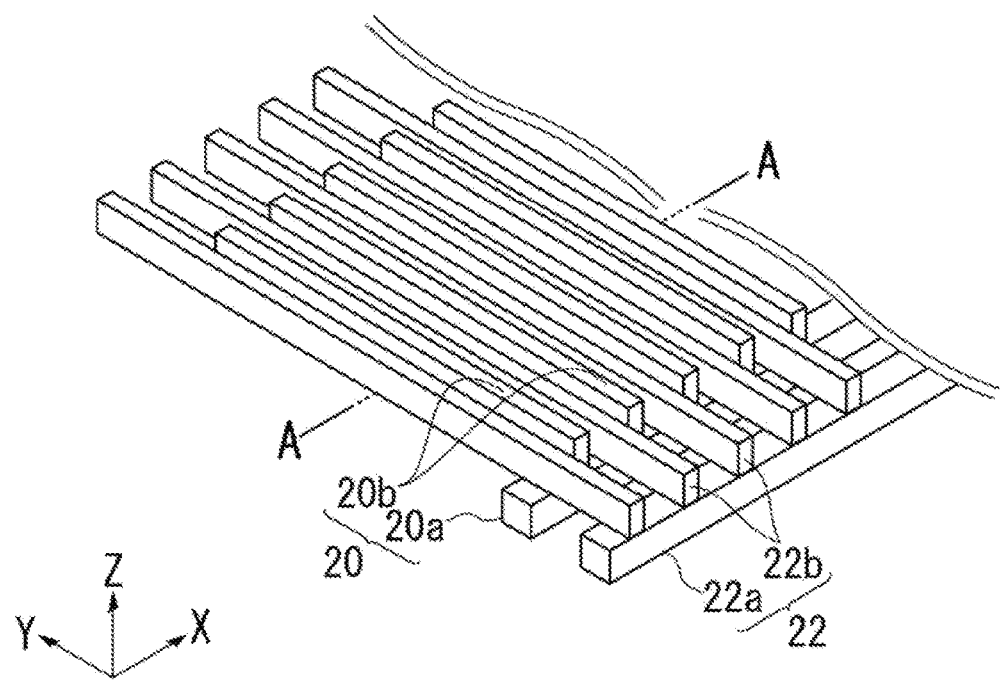
FIGS. 3A and 3B illustrate an example of a fork device and a fixing table, where
Figure 3B:
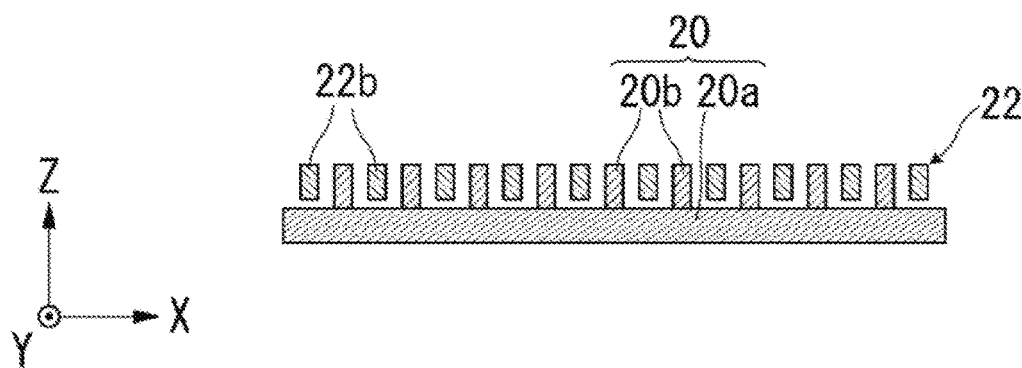

FIGS. 3A and 3B illustrate an example of the fork device 20 and the fixing table 22. As illustrated in FIGS. 3A and 3B, the fork device 20 is disposed such that the base portion 20a is located below the rod portions 22b of the fixing table 22. The arm portion 20b of the fork device 20 and the rod portion 22b of the fixing table 22 are alternately disposed. This enables the plurality of rod portions 22b to move in the Y direction while preventing interference with the arm portions 20b of the fork device 20. As illustrated in FIG. 3B, the upper surfaces of the arm portions 20b of the fork device 20 are flush with the upper surfaces of the rod portions 22b of the fixing table 22. Therefore, even when the arm portions 20b move to the first processing region 10R, the upper surfaces of the arm portions 20b are flush with the upper surfaces of the rod portions 22b of the fixing table 22. Thus, there is no level difference when the workpiece W is transferred from the arm portions 20b to the fixing table 22, and the workpiece W is stably transferred.

Returning to FIG. 1 and FIG. 2, the transfer device 24 transfers the workpiece W in the first processing region 10R toward the standby region 20R in the −Y direction, and transfers the workpiece W in the standby region 20R toward the first processing region 10R in the +Y direction. The transfer device 24 is disposed on the −Y side of the second processing device 30 (the second processing region 30R). The transfer device 24 is disposed so as to overlap the standby region 20R. The transfer device 24 includes a carriage 25, a plate 26, and workpiece holders 27.

The carriage 25 extends in the X direction over the fork device 20 and the fixing table 22. The carriage 25 is able to be moved along a pair of guides 28 in the Y direction by a driving device (not illustrated). The pair of guides 28 are provided along the Y direction so as to sandwich the fork device 20 and the fixing table 22 therebetween in the X direction. Examples of the driving device include a ball screw mechanism and a linear motor. The plate 26 preferably is rectangular or substantially rectangular when viewed from above, and is fixed to a +Y-side surface of the carriage 25. A length of the plate 26 in the X direction corresponds to a length of the workpiece W in the X direction. A length of the plate 26 in the Y direction is such that the workpiece holders 27 hold the workpiece W when the carriage 25 comes close to the −Y side of the second processing device 30. The plate 26 may be replaceable, or may be movable in the X direction with respect to the carriage 25.

The three workpiece holders 27 are provided, on the +Y side of the plate 26, spaced apart from each other in the X direction. The workpiece holders 27 each protrude from the plate 26 in the +Y direction. The workpiece holders 27 are able to be driven by a driving device (not illustrated) to hold or release an end of the workpiece W. Any number of workpiece holders 27 may be provided. For example, one, two, or four or more workpiece holders 27 may be provided. The workpiece holders 27 may adsorb a portion of the workpiece W instead of holding the workpiece W.

The transfer device 24 moves in the Y direction while holding the workpiece W with the workpiece holders 27, to transfer the workpiece W in the Y direction. The second processing region 30R is located in a portion of a transfer path of the workpiece W transferred by the transfer device 24. Thus, the transfer device 24 is able to transfer the workpiece W to both of the first processing region 10R and the second processing region 30R. The transfer device 24 holds the workpiece W in the first processing region 10R with the workpiece holders 27. This prevents displacement of the workpiece W during processing of the first processing device 10, ensuring the processing position accuracy of the laser head 11. Portions of the plate 26 and the workpiece holders 27 are able to pass through the opening 34 of the below-described second processing device 30. Since the transfer device 24 is disposed above the fork device 20 and the fixing table 22 in the standby region 20R, and moves in the Y direction while overlapping the arm portions 20b of the fork device 20 when viewed from above, a space above the standby region 20R and the fixing table 22 is able to be utilized to make the entire system compact.

The second processing device 30 performs forming, tapping, or other processing on the workpiece W. The second processing device 30 is disposed between the first processing device 10 (the first processing region 10R) and the standby region 20R of the fork device 20. The second processing device 30 includes the frame 31, processing tools 32, and guides 33. As illustrated in FIG. 2, the frame 31 supports the processing tools 32 and the guides 33. The opening 34, through which the fork device 20, a portion of the plate 26, the workpiece holders 27, and the workpiece W are able to pass, is preferably located at the center or approximate center of the frame 31. The opening 34 preferably is rectangular or substantially rectangular when viewed from the −Y direction. The frame 31 is disposed between the first processing device 10 and the fixing table 22 such that its longitudinal direction is parallel or substantially parallel to the X direction. The shape of the frame 31 is not particularly limited, and may be any shape such as a gate shape, for example.

The processing tools 32 are tools used to process the workpiece W. The processing tools 32 include a plurality of processing tools that perform different or similar types of processing. In this preferred embodiment, the processing tools 32 include a press tool 35 and a tap tool 36. The processing tools 32 may be any tool other than the press tool 35 and the tap tool 36. The press tool 35 sandwiches the workpiece W between upper tools 37 such as punches and lower tools 38 such as dies to process the workpiece W. The press tool 35 has an upper-tool support block 39 that holds the plurality of upper tools 37, a lower-tool support block 40 that holds the plurality of lower tools 38, and a forming head 41. The upper-tool support block 39 and the forming head 41 are disposed above the opening 34. The lower-tool support block 40 is disposed below the opening 34. The forming head 41 is disposed above the upper-tool support block 39.

Each of the plurality of upper tools 37 corresponds to at least one of the plurality of lower tools 38. The plurality of upper tools 37 and the plurality of lower tools 38 may each perform different processing on the workpiece W. Since the upper-tool support block 39 and the lower-tool support block 40 hold the upper tools 37 and the lower tools 38, respectively, the processing tool is easily changed by selecting any of the upper tools 37 and the lower tools 38.

The upper tools 37 and the lower tools 38 are arranged in the X direction, and held by the upper-tool support block 39 and the lower-tool support block 40, respectively. Thus, any of the upper tools 37 and the lower tools 38 is able to be selected by merely moving the forming head 41 in the X direction. The forming head 41 includes a head portion 41a that is able to be moved in the vertical direction by a driving device (not illustrated). The head portion 41a is positioned at any of the upper tools 37 and the lower tools 38 and is driven downward to move the upper tool 37 toward the lower tool 38. The lower-tool support block 40 includes a forming head 40b, and moves the selected lower tool 38 upward. As a result, the workpiece W is processed by using the upper tool 37 and the lower tool 38. After the processing of the workpiece W, the head portion 41a returns to its original position, and the upper tool 37 and the lower tool 38 also return to their original positions. The lower-tool support block 40 may or may not include the forming head 40b.

The plurality of guides 33 that guide the processing tools 32 are attached to a −Y-side surface of the frame 31. The plurality of guides 33 each extend in a direction (X direction) intersecting the advancing/retracting direction (Y direction) of the arm portions 20b. The plurality of guides 33 that guide the processing tools 32 along the X direction include an upper guide 42 that guides the upper-tool support block 39, a lower guide 43 that guides the lower-tool support block 40, a head guide 45 that guides the forming head 41, and a tap guide 46 that guides the tap tool 36. The upper guide 42 is disposed above the opening 34. The lower guide 43 is disposed below the opening 34. That is, the upper guide 42 and the lower guide 43 sandwich the opening 34 therebetween in the vertical direction. The guides 33 are not limited to individually guiding moving targets such as the upper-tool support block 39, and one guide (for example, the upper guide 42) may guide two or more moving targets (for example, the upper-tool support block 39 and the tap tool 36). This reduces the number of guides 33, facilitating arrangement of the guides 33.

The upper-tool support block 39 includes a driving device 39a. The upper-tool support block 39 is moved along the upper guide 42 in the X direction by the driving device 39a. The lower-tool support block 40 includes a driving device 40a. The lower-tool support block 40 is moved along the lower guide 43 in the X direction by the driving device 40a. By moving the upper-tool support block 39 and the lower-tool support block 40, the upper tools 37 and the lower tools 38 are able to be positioned at the workpiece W in the X direction. The controller 50 controls the movement of the upper-tool support block 39 and the lower-tool support block 40, but the upper-tool support block 39 and the lower-tool support block 40 may be moved in synchronization with each other. Thus, the upper-tool support block 39 and the lower-tool support block 40 are easily positioned.

The forming head 41 includes a driving device 41b. The forming head 41 is able to be moved along the head guide 45 in the X direction by the driving device 41b. The controller 50 controls to position the forming head 41 above any of the upper tools 37. The forming head 41 may be connected to the upper-tool support block 39 with a pin or the like so as to move in the X direction with movement of the upper-tool support block 39. Thus, the forming head 41 does not require the driving device 41b such that manufacturing costs are reduced.

For example, the tap tool 36 performs tapping of forming a threaded hole in the workpiece W. The tap tool 36 includes a tap 36a used to form a threaded hole. The tap 36a is driven by a driving device (not illustrated). Tapping is performed by moving the tap 36a downward with respect to the workpiece W to bring the tap 36a into contact with the workpiece W, and then rotating the tap 36a by the driving device (not illustrated). The tap tool 36 includes a driving device 36b. The tap tool 36 is moved along the tap guide 46 in the X direction by the driving device 36b. When the tap tool 36 is moved in the X direction, the controller 50 controls the upper-tool support block 39, the lower-tool support block 40, and the forming head 41 to move to the +X side, to establish a moving path for the tap tool 36.

The second processing device 30 includes position detectors 48 that detect the position of the processing tools 32. A non-contact sensor such as an optical sensor may be used for the position detectors 48, but any other suitable detector may be used. The position detectors 48 are provided for the tap tool 36, the upper-tool support block 39, the lower-tool support block 40, and the forming head 41. Location information acquired by each of the position detectors 48 is sent to the controller 50, and is used to control the position of the processing tools 32.

The second processing device 30 includes the second processing region 30R that is a region where the workpiece W is processed using the press tool 35 or the tap tool 36. The second processing region 30R is located between the first processing region 10R and the standby region 20R. In the second processing region 30R, the transfer device 24 transfers the workpiece W in the Y direction, and the press tool 35 or the tap tool 36 moves in the X direction, resulting in that the press tool 35 or the tap tool 36 is positioned at a desired position of the workpiece W.

The controller 50 includes a central processing unit (CPU), storage devices such as a memory and a hard disc, and a program necessary for various types of control. For example, the controller 50 controls the position and laser output of the laser head 11 of the first processing device 10, driving of the fork device 20, driving of the transfer device 24, holding and releasing with the workpiece holders 27, and positioning and processing operation of each of the processing tools 32 of the second processing device 30.

Figure 4A:
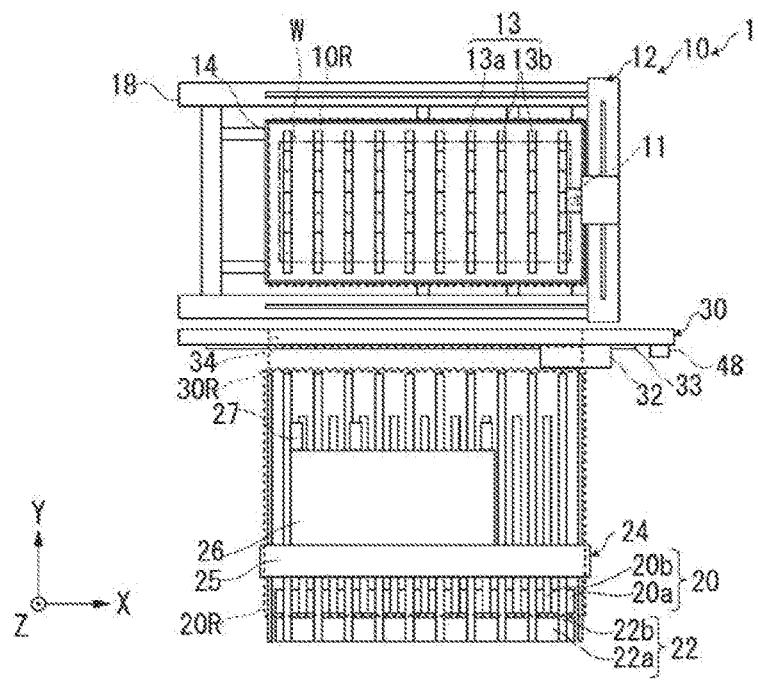
FIGS. 4A and 4B are views illustrating operations of the plate processing system.
Figure 4B:
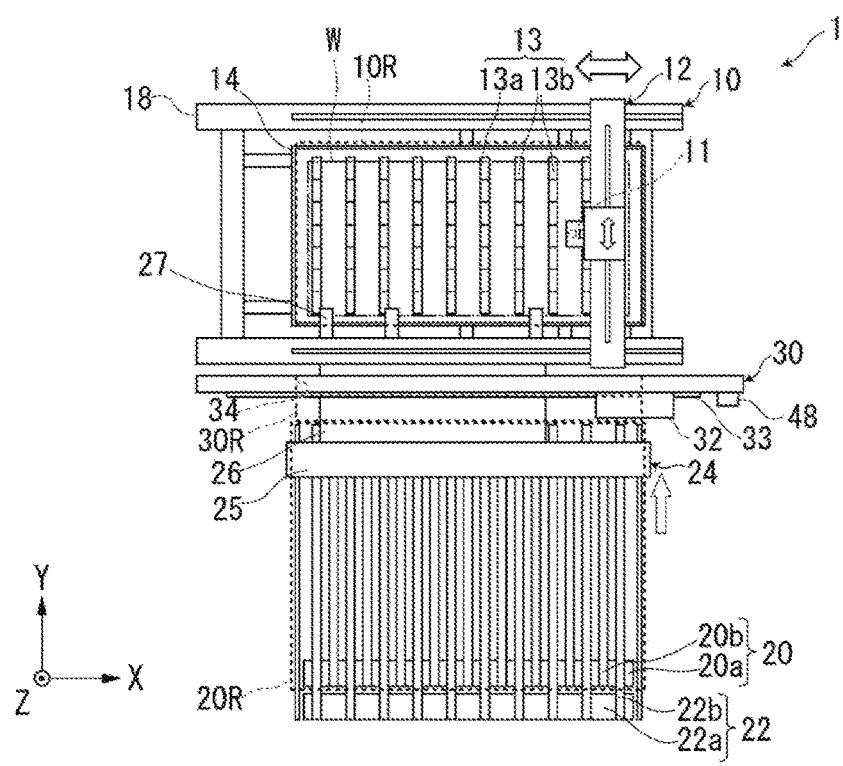

Next, the operation of the plate processing system 1 will be described with reference to FIG. 4A to FIG. 8B. Note that the following description is merely an example, and is not intended to limit the operation. First, the workpiece W is carried into the first processing region 10R. The workpiece W is placed at the position 13P (see FIG. 1) on the palette 13. Then, when the palette 13 moves in the −X direction, as illustrated in FIG. 4A, the workpiece W is disposed in the first processing region 10R. Next, as illustrated in FIG. 4B, the transfer device 24 moves in the +Y direction to hold the workpiece W with the workpiece holders 27. This prevents displacement of the workpiece W during laser processing.

In the laser processing, the laser head 11 emits a laser beam to the workpiece W while being moved in the X direction, the Y direction, and the Z direction by the head driver 12. Since the laser head 11 is moved relatively with respect to the workpiece in the laser processing, the workpiece W is processed at high speed. In the laser processing, partial cutting, for example, punching may be performed, instead of cutting the contour of the product.

Figure 5A:
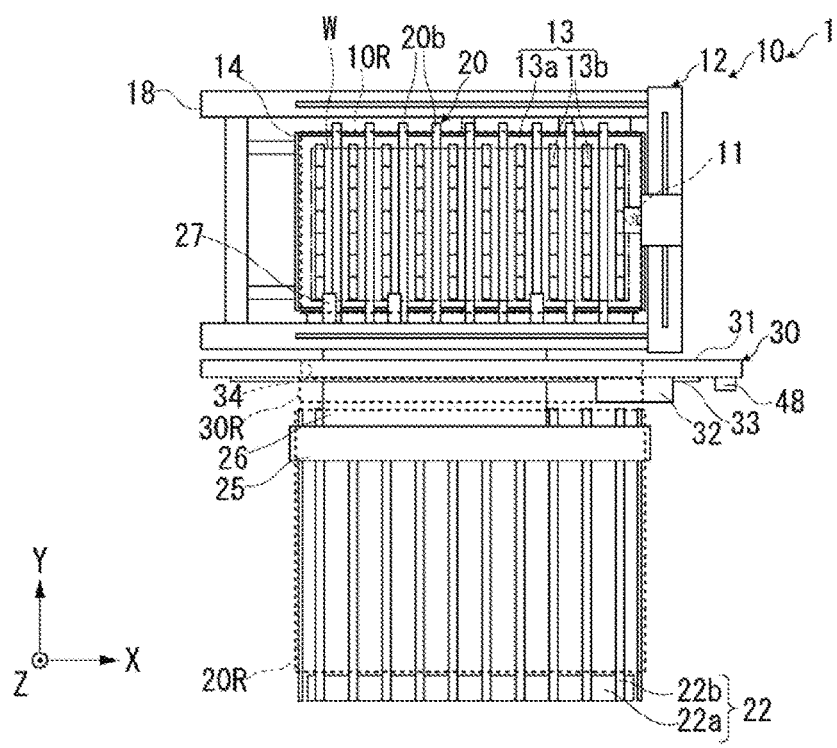
FIGS. 5A and 5B are views illustrating operations of the plate processing system after the operations in FIGS. 4A and 4B.
Figure 7A:
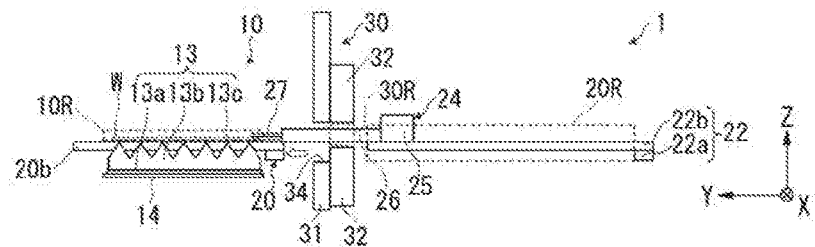
FIGS. 7A to 7E are sectional views illustrating operations of the plate processing system.
Figure 7B:
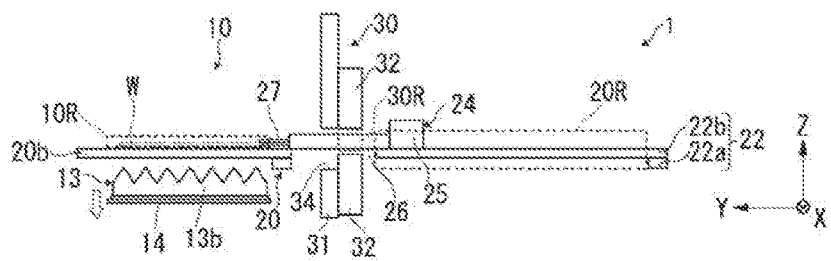

Next, as illustrated in FIG. 5A, the fork device 20 is moved in the +Y direction to cause each of the arm portions 20b to enter between the adjacent support plates 13b. FIG. 7A illustrates the state where each arm portion 20b enters between the support plates 13b. In this state, the workpiece W is mainly placed on the support plates 13b. Subsequently, the mounting portion 14 (see FIG. 2) is driven to lower the palette 13. As a result, as illustrated in FIG. 7B, the workpiece W is placed onto the arm portions 20b from the support plates 13b. At this time, even when a portion of the workpiece W is welded to the support plates 13b by the laser processing, the welded portion is able to be peeled off. Although not illustrated, the workpiece W is placed on the brushes on the upper surfaces of the arm portions 20b. The palette 13 is not necessarily lowered. For example, the workpiece W is able to be received from the palette 13 by raising the arm portions 20b. Alternatively, the workpiece W may be received by the arm portions 20b by lowering the palette 13 and raising the arm portions 20b.

Figure 5B:
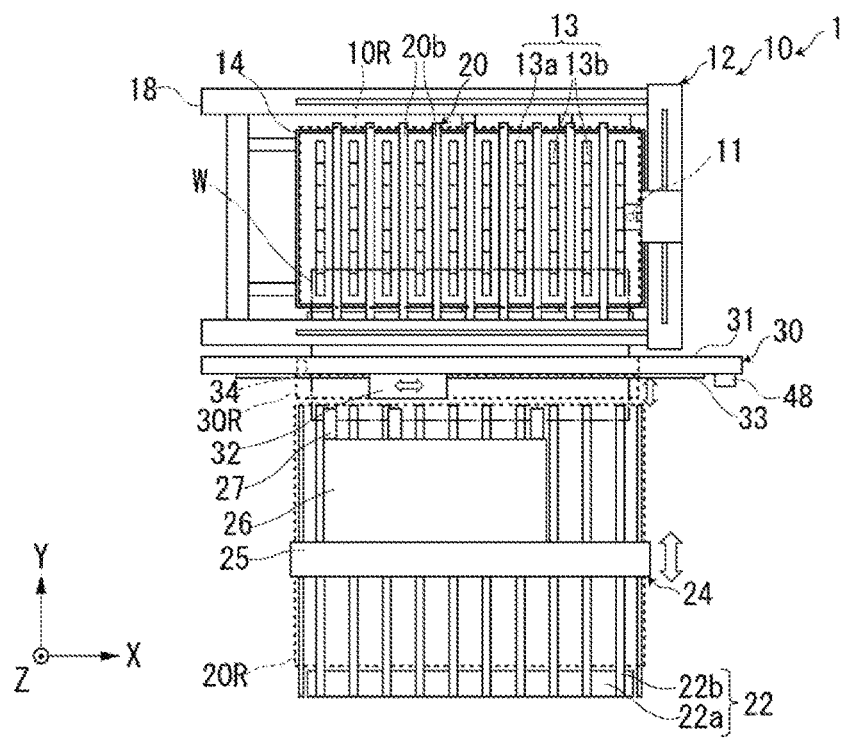
Figure 7C:
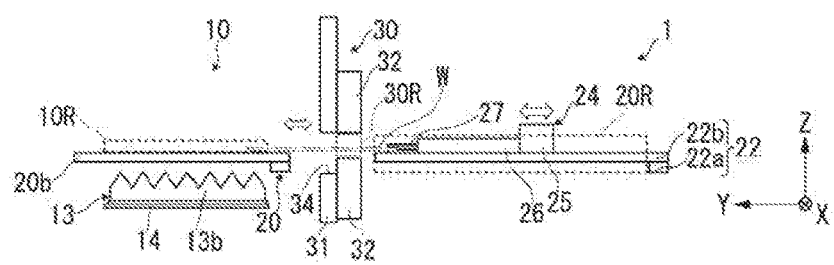

Next, as illustrated in FIG. 5B, the transfer device 24 is moved in the −Y direction, with the workpiece W placed on the arm portions 20b. Thus, the workpiece W is transferred in the −Y direction, and as illustrated in FIG. 5B and FIG. 7C, a portion of the workpiece W is positioned in the Y direction in the second processing region 30R. The workpiece W is held by the workpiece holders 27 so as to prevent displacement during processing. The base portion 20a and the arm portions 20b of the fork device 20 are disposed in the first processing region 10R, and are used as a table to transfer the workpiece W.

Figure 8A:
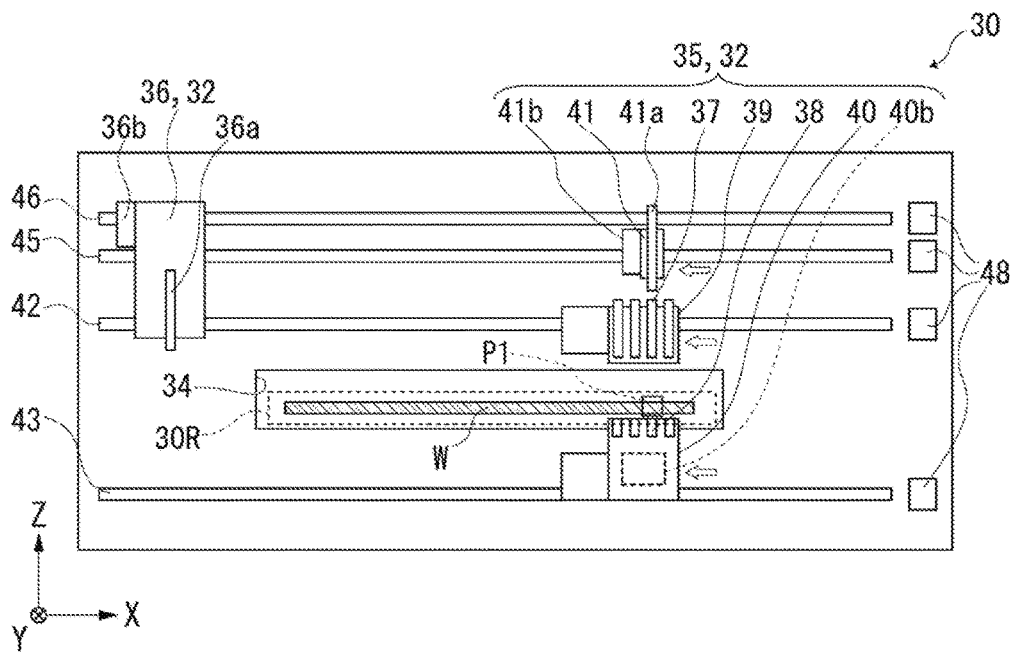
FIGS. 8A and 8B are views illustrating operations of a press tool.
Figure 8B:
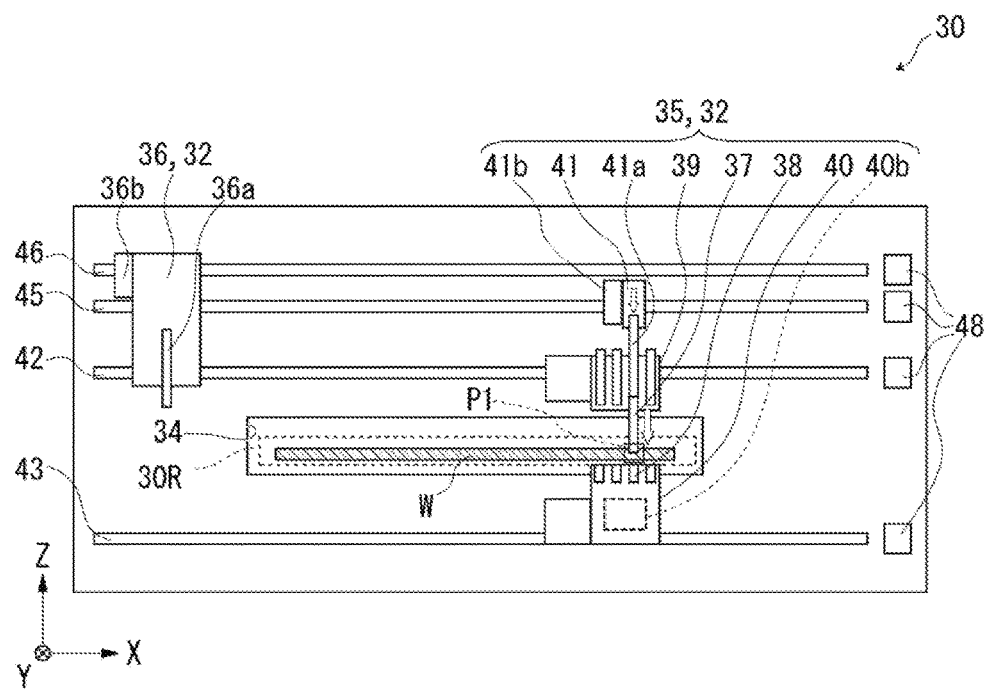

Next, the second processing device 30 processes the workpiece W. The workpiece W is positioned in the Y direction, and each processing tool 32 is moved to a desired position of the workpiece W in the X direction. FIGS. 8A and 8B and FIGS. 9A and 9B illustrate operations of the press tool 35 and the tap tool 36. In the case of using the press tool 35, first, as illustrated in FIG. 8A, the upper-tool support block 39 and the lower-tool support block 40 are moved in the X direction such that the desired upper tool 37 and lower tool 38 are located at a processing position P1 of the workpiece W. Simultaneously with or apart from the movement of the upper-tool support block 39, the forming head 41 is moved in the X direction and positioned above the upper tool 37 to be used. Subsequently, as illustrated in FIG. 8B, the head portion 41a is driven to move the upper tool 37 downward, and the forming head 41 moves the lower tool 38 upward, such that the upper tool 37 and the lower tool 38 form the workpiece W at the processing position P1.

Figure 9A:
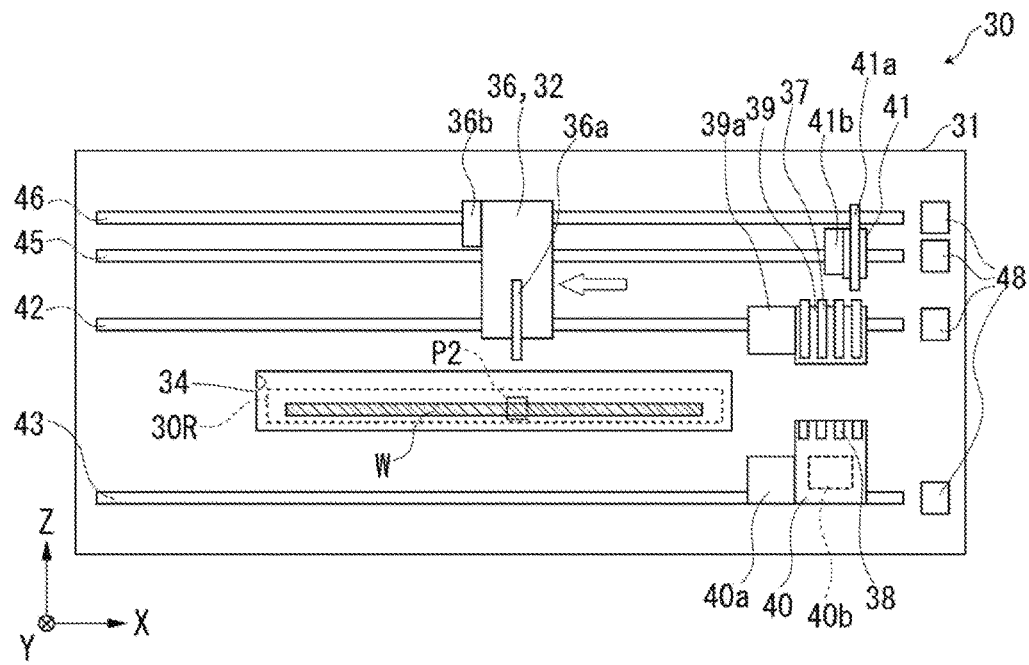
FIGS. 9A and 9B are views illustrating operations of a tap tool.
Figure 9B:
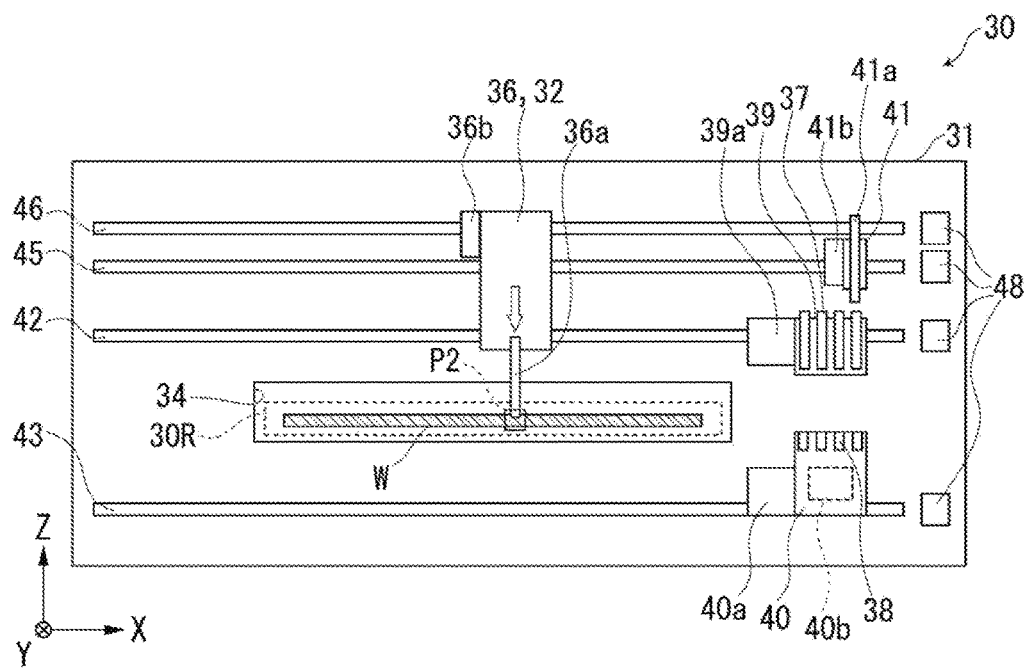

In the case of using the tap tool 36, first, as illustrated in FIG. 9A, the upper-tool support block 39, the lower-tool support block 40, and the forming head 41 are retracted to the +X side. After or during the retraction, the tap tool 36 is moved in the X direction such that the tap 36a is aligned with a processing position P2 of the workpiece W. Subsequently, as illustrated in FIG. 9B, the tap 36a is driven to perform tapping on the workpiece W at the processing position P2.

The press tool 35 or the tap tool 36 is moved to a plurality of positions in the X direction to perform forming or tapping. Subsequently, the transfer device 24 shifts the workpiece W in the −Y direction, and the press tool 35 or the tap tool 36 processes the plurality of positions in the X direction. By repeating such operations, desired processing is performed on the processing positions of the entire workpiece W. The workpiece W is stably transferred in the Y direction under support with the arm portions 20b of the fork device 20 and the rod portions 22b of the fixing table 22. Since the upper surfaces of the arm portions 20b are flush with the upper surfaces of the rod portions 22b, there is no level difference, and damage is prevented from being caused on the lower surface of the transferred workpiece W.

Figure 6A:
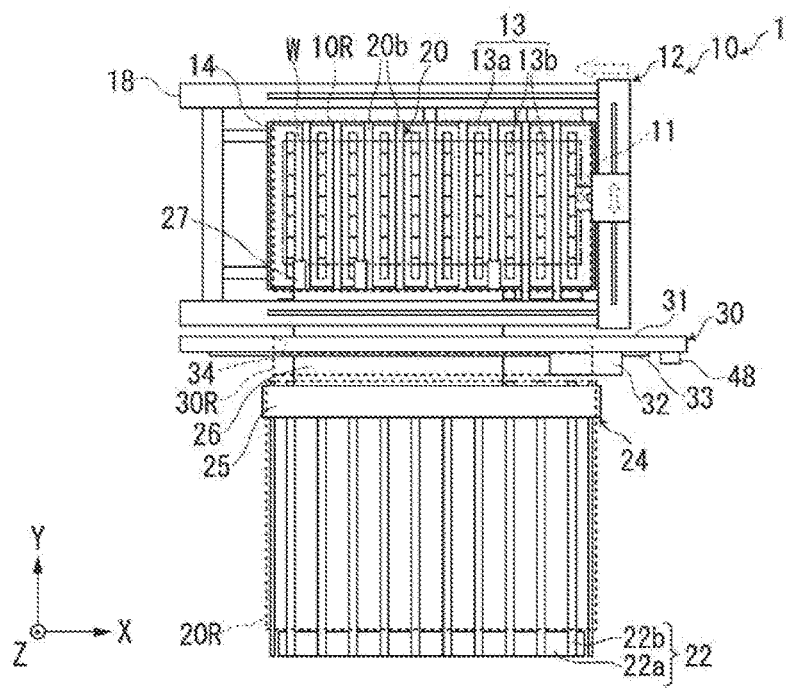
FIGS. 6A and 6B are views illustrating operations of the plate processing system after the operations in FIGS. 5A and 5B.
Figure 7D:
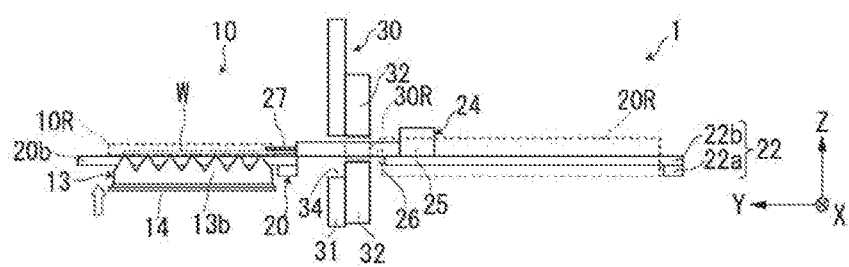
Figure 7E:
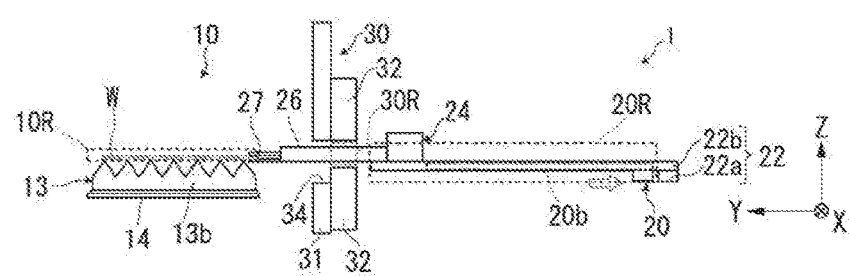

Next, as illustrated in FIG. 6A, the processed workpiece W is transferred to the first processing region 10R by the transfer device 24. In the first processing region 10R, the workpiece W is placed on the arm portions 20b of the fork device 20. Subsequently, the palette 13 is raised. As a result, as illustrated in FIG. 7D, the workpiece W is placed onto the support plates 13b from the arm portions 20b. Then, as illustrated in FIG. 7E, the fork device 20 is moved in the −Y direction to the standby region 20R. Subsequently, the laser head 11 emits a laser beam to the workpiece W while being moved in the X direction, the Y direction, and the Z direction by the head driver 12. In this laser processing, a remaining portion of the previous laser processing may be cut, or the contour of the product may be cut. During the laser processing, the workpiece holders 27 of the transfer device 24 hold the workpiece W to prevent displacement of the workpiece W. However, such second laser processing is optional and may not be performed. In this case, the workpiece W may be carried out with the palette 13, or a product may be picked up from the workpiece W in the standby region 20R without transferring the workpiece W to the palette 13.

Figure 6B:
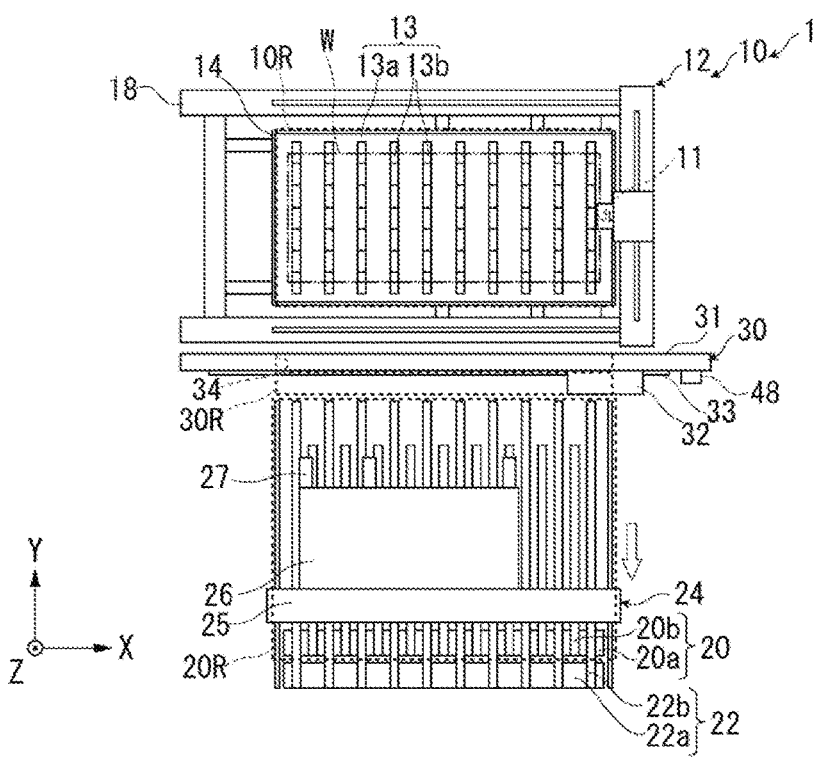

Next, as illustrated in FIG. 6B, after the laser processing is finished, the transfer device 24 releases holding of the workpiece W with the workpiece holders 27, moves in the −Y direction, and returns to the standby region 20R. Then, the palette 13 moves in the +X direction, with the processed workpiece W placed thereon, and carries the workpiece W out of the first processing region 10R. After the laser processing is finished, the arm portions 20b of the fork device 20 may be advanced between the support plates 13b again. Subsequently, the palette 13 may be lowered to place the workpiece W on the arm portions 20b, and then, the palette 13 may be raised to place the workpiece W on the support plates 13b. By placing the workpiece W onto the arm portions 20b from the support plates 13b, even when a portion of the workpiece W is welded to the support plates 13b by laser processing, the welded part is able to be peeled off.

For example, a product is picked up from the processed workpiece W at the position 13P (see FIG. 1) by a sorter (not illustrated), and a remaining material is discharged from the palette 13. Thereafter, a new workpiece W is placed on the palette 13 and the above-described operations are performed. Such operations are repeated to obtain a plurality of processed workpieces W.

As described above, in this preferred embodiment, since the first processing device 10 and the second processing device 30 commonly use the transfer device 24, the workpiece W is transferred without being passed. Therefore, the laser head 11 and the processing tools 32 accurately process the workpiece W. Since the second processing region 30R is disposed between the first processing region 10R and the standby region 20R, and the workpiece W is transferred in the standby region 20R, the entire system is able to be made compact. By moving the laser head 11, the workpiece W is processed at high speed.

Other Preferred Embodiments

Figure 10A:
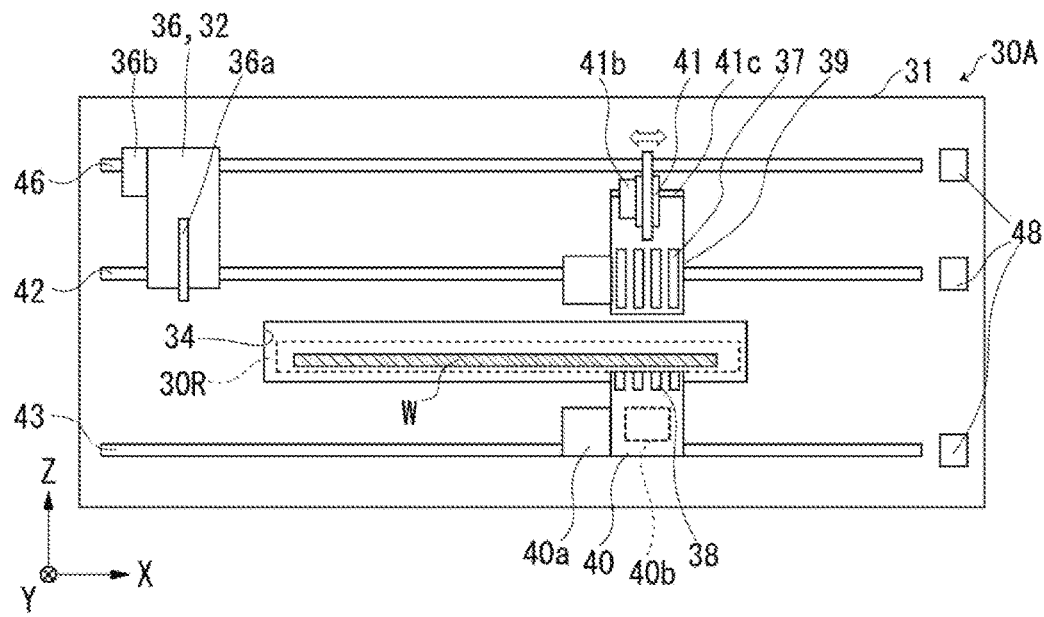
FIGS. 10A and 10B are views each illustrating a second processing device according to another preferred embodiment of the present invention.

Next, other preferred embodiments of the present invention will be described with reference to the drawings. Components similar to those in the above preferred embodiment are given the same reference numerals, and description thereof is simplified or omitted. The matters described in the above preferred embodiment can be applied to each of the following preferred embodiments if applicable. FIG. 10A is a view illustrating a second processing device 30A according to another preferred embodiment of the present invention. As illustrated in FIG. 10A, the second processing device 30A has a structure such that the forming head 41 is able to move along a selection guide 41c provided on the upper-tool support block 39. The forming head 41 is moved along the selection guide 41c in the X direction by the driving device 41b, and is positioned above the desired upper tool 37.

As described above, in the second processing device 30A, since the guide of the forming head 41 is provided on the upper-tool support block 39 rather than the frame 31, the moving range of the forming head 41 is small, such that a small driving device 41b is achieved. The position of the forming head 41 with respect to the upper-tool support block 39 is detected by a linear encoder, for example.

Figure 10B:
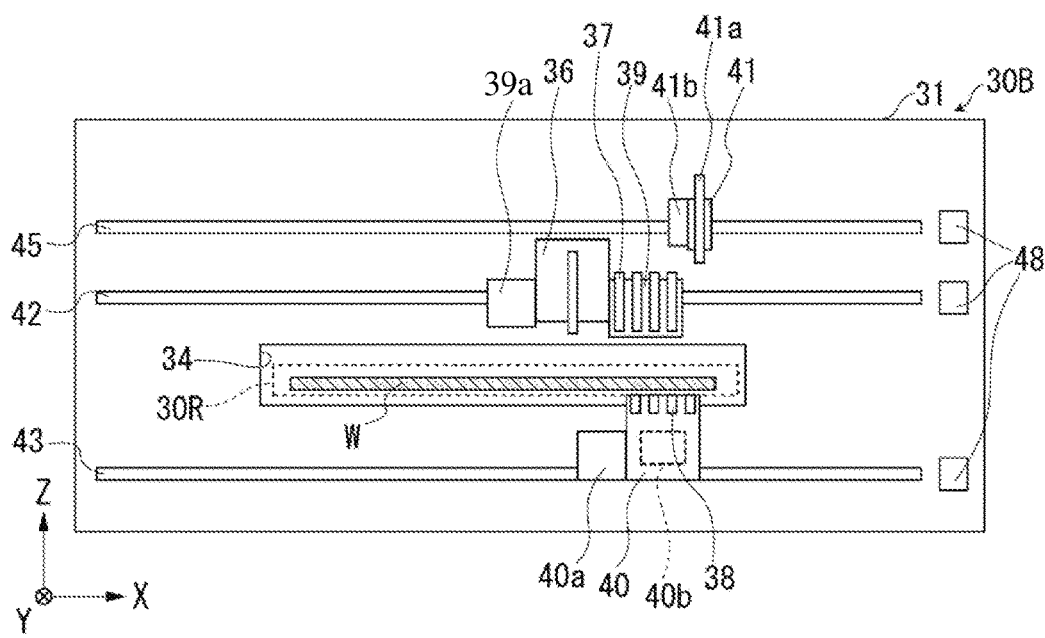

Next, FIG. 10B illustrates a second processing device 30B according to another preferred embodiment of the present invention. As illustrated in FIG. 10B, in the second processing device 30B, the tap tool 36 is fixed to the −X side of the upper-tool support block 39. Accordingly, a guide that guides the tap tool 36 to the frame 31 is not required. The tap tool 36 is driven by the driving device 39a of the upper-tool support block 39 to move together with the upper-tool support block 39 in the X direction.

As described above, in the second processing device 30B, since the tap tool 36 is fixed to the upper-tool support block 39, the tap guide 46 for the tap tool 36, the driving device 36b, and the position detectors 48 are not required, such that device costs are reduced. The tap tool 36 is not necessarily fixed to the −X side of the upper-tool support block 39, and may be fixed to the +X side of the upper-tool support block 39.

Figure 11:
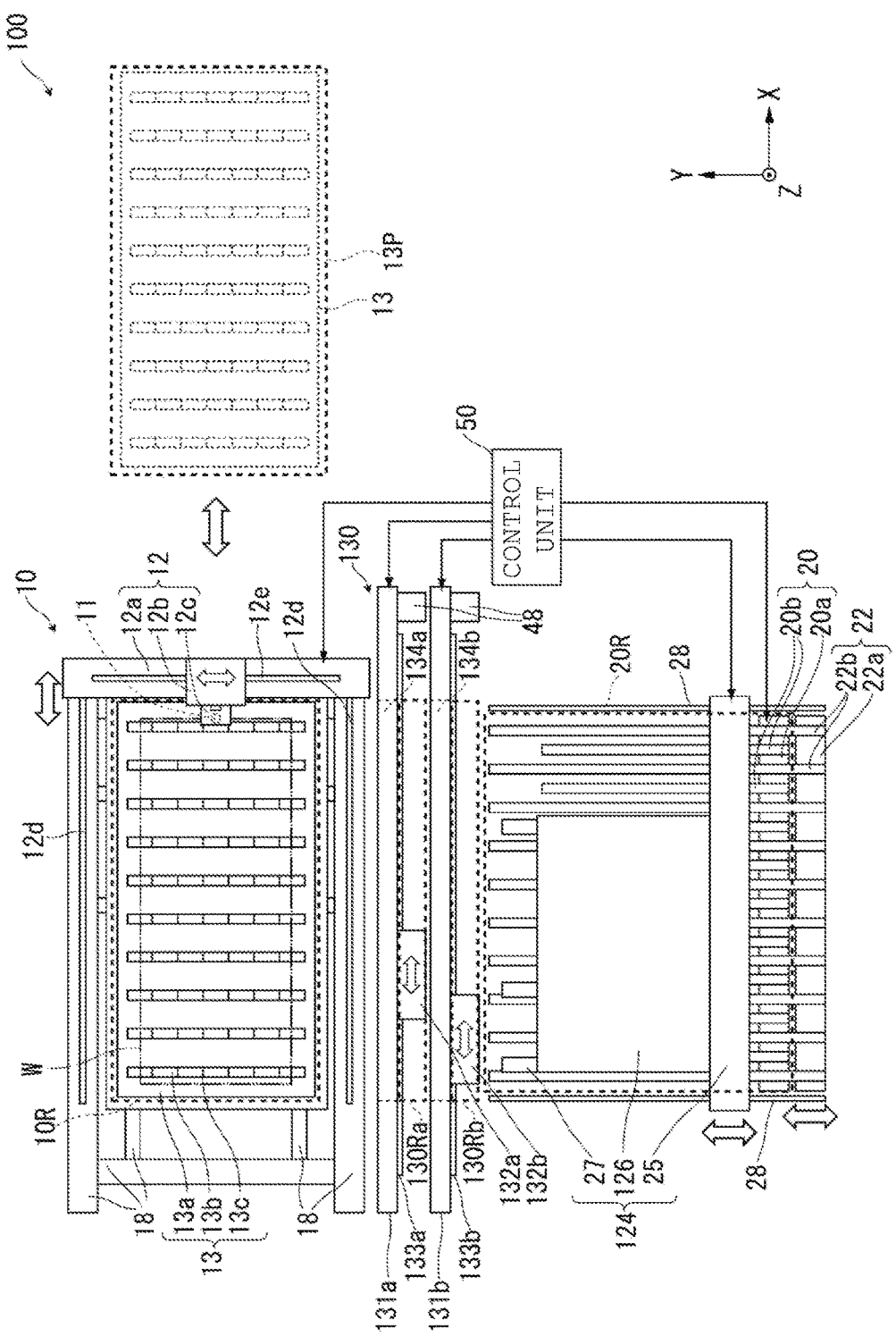
FIG. 11 is a plan view illustrating a plate processing system according to another preferred embodiment of the present invention.

Next, a plate processing system according to another preferred embodiment of the present invention will be described. FIG. 11 is a view illustrating a plate processing system 100 according to another preferred embodiment of the present invention. As illustrated in FIG. 11, the plate processing system 100 is different from the plate processing system 1 in FIG. 1 in that the plate processing system 100 includes a transfer device 124 and a second processing device 130. The transfer device 124 transfers the workpiece W in the first processing region 10R and two second processing regions 130Ra, 130Rb in the Y direction. The transfer device 124 includes a plate 126 fixed to the +Y side of the carriage 25. The workpiece holders 27 are attached to the +Y side of the plate 126. The plate 126 is longer than the plate 26 in FIG. 1 in the Y direction such that the workpiece holders 27 hold the workpiece W in the first processing region 10R via the two second processing regions 130Ra, 130Rb.

The second processing device 130 includes two frames 131a, 131b, and processing tools 132a, 132b that move in the X direction along guides 133a, 133b provided on the frames 131a, 131b, respectively. The frames 131a, 131b are arranged in the Y direction. Similar to the frame 31 illustrated in FIG. 1, the frames 131a, 131b include openings 134a, 134b, respectively, at their centers. The openings 134a, 134b each have a structure such that the workpiece W, a portion of the plate 126 of the transfer device 124, and the fork device 20 are able to pass therethrough in the Y direction.

The guides 133a, 133b preferably are the same as the guides 33 illustrated in FIG. 1. The second processing region 130Ra is a region where the processing tool 132a is able to move along the guide 133a. The second processing region 130Rb is a region where the processing tool 132b is able to move along the guide 133b. The second processing regions 130Ra, 130Rb are arranged in the Y direction.

For example, the processing tool 132a is the press tool 35 illustrated in FIG. 2, and the processing tool 132b is the tap tool 36 illustrated in FIG. 2. However, the processing tools 132a, 132b may each be the press tool 35, the tap tool 36, or any other processing tool. By using the plurality of frames 131a, 131b, the number of available processing tools is able to be increased, and the processing tools are able to be individually moved in the X direction without interference. Similar to the frame 31 illustrated in FIG. 1, one or both of the frames 131a, 131b may include a plurality of processing tools.

In the second processing device 130, the transfer device 124 transfers the workpiece W to position the workpiece W in one or both of the second processing regions 130Ra, 130Rb in the Y direction, and one or both of the processing tools 132a, 132b are driven in the X direction to process a predetermined portion of the workpiece W. As described in the above preferred embodiment, the second processing regions 130Ra, 130Rb are disposed between the first processing region 10R and the standby region 20R, and the workpiece W is transferred in the standby region 20R, such that the entire system is compact.

Figure 12A:
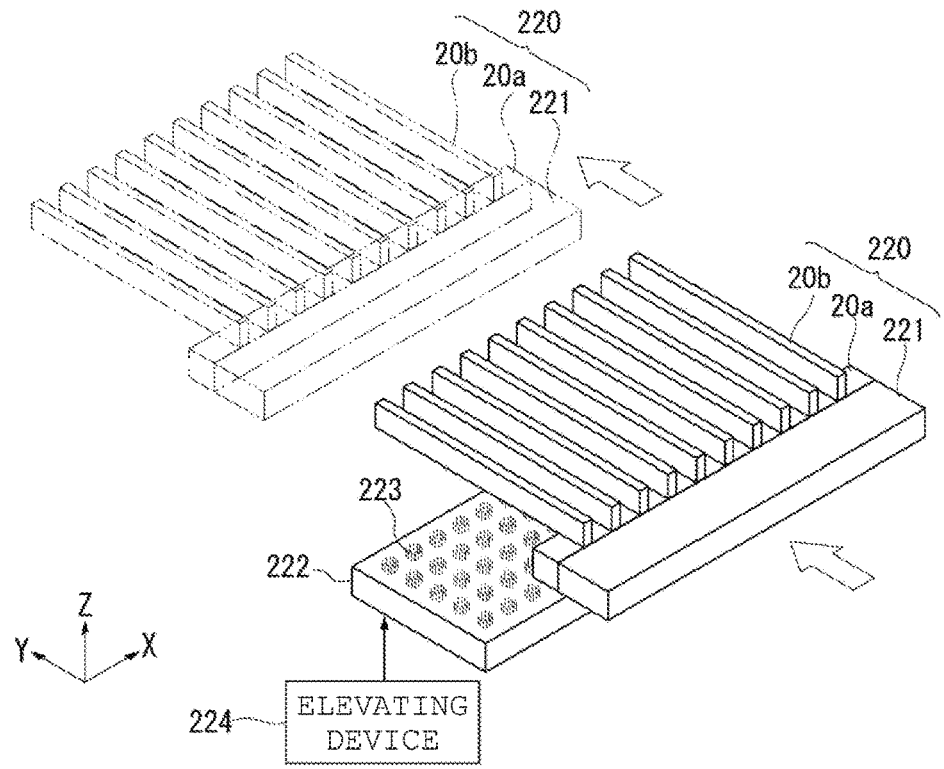
FIGS. 12A and 12B are perspective views illustrating an example of a fork device according to another preferred embodiment of the present invention and a support table.
Figure 12B:
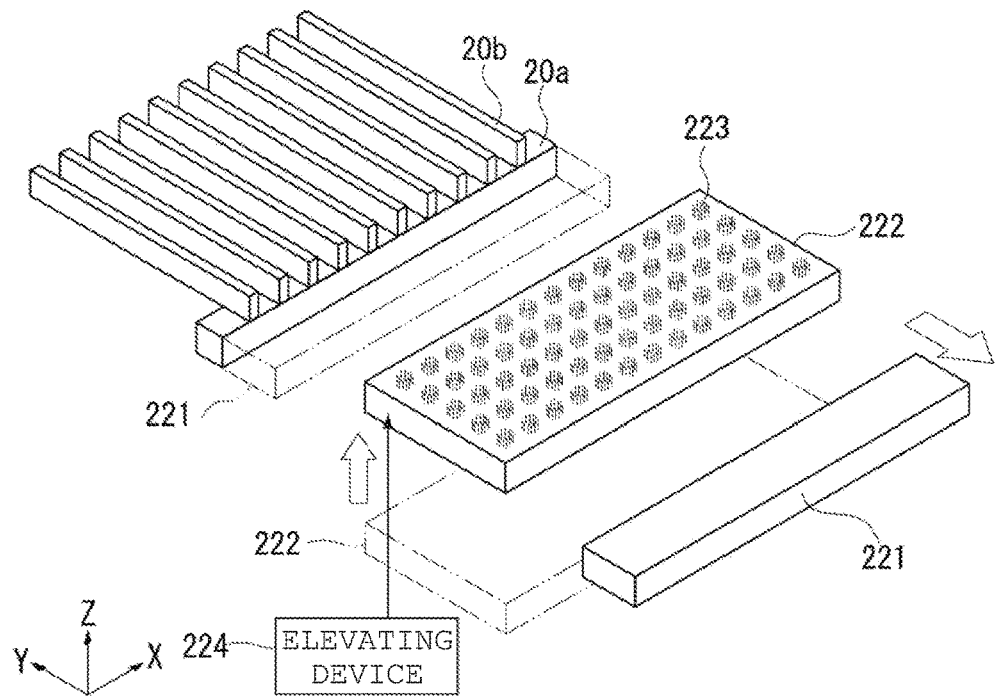

Next, a fork device as a support device according to another preferred embodiment of the present invention and a support table will be described. FIGS. 12A and 12B is a perspective view illustrating an example of a fork device (support device) 220 according to another preferred embodiment of the present invention and a support table 222. The plate processing system including the fork device 220 and the support table 222 can have the same configuration as the plate processing system in the above preferred embodiment except for the fork device 220 and the support table 222. As in the fork device 20 in the above preferred embodiment, the arm portions 20b advance and retract between the standby region 20R and the first processing region 10R. The support table 222 is provided instead of the fixing table 22 in the above preferred embodiment.

As illustrated in FIGS. 12A and 12B, the fork device 220 includes the base portion 20a, the arm portions 20b, and an advance/retract driver 221. The base portion 20a and the arm portions 20b are advanced and retracted in the Y direction by the advance/retract driver 221. The advance/retract driver 221 is disposed on the −Y side of the base portion 20a, and similar to the base portion 20a and the arm portions 20b, the advance/retract driver 221 is able to be moved along a guide (not illustrated) in the Y direction. The advance/retract driver 221 may be driven in any way. For example, the advance/retract driver 221 may include a pinion gear rotatably driven by an electric motor or the like, and may be moved in the Y direction by having the pinion gear engaged with a rack provided along the guide (not illustrated).

The advance/retract driver 221 is able to be separated from the base portion 20a. The advance/retract driver 221 may include a claw that holds a portion of the base portion 20a, and may be coupled to and released from the base portion 20a with the claw. The advance/retract driver 221 may be coupled to and released from the base portion 20a in any way. For example, the base portion 20a may be coupled to and released from the advance/retract driver 221 using an electromagnet or the like.

The support table 222 preferably includes a rectangular or substantially rectangular plate-shaped member, and includes a plurality of brushes 223 on its upper surface. The dimension of the support table 222 is set depending on the dimension of the supported workpiece W. The brushes 223 that support the workpiece W at their upper ends are located at regular intervals. However, the plurality of brushes 223 may be arranged in any way, and instead of the brushes 223, a plurality of free ball bearings may be disposed. The brushes 223 may or may not be provided. The support table 222 is able to be elevated by an elevator 224. The support table 222 moves up and down between a raised position where the upper surface (upper ends of the brushes 223) becomes flush or substantially flush with the upper surfaces of the arm portions 20b of the fork device 220, and a retracted position where the upper surface is retracted downward so as not to interfere with advancement/retraction of the fork device 220. Examples of the elevator 224 include an electric motor, and hydraulic or pneumatic cylinder mechanism.

Figure 13A:
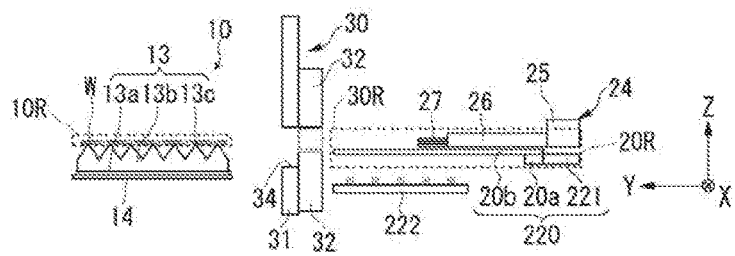
FIGS. 13A to 13E are sectional views illustrating operations of the plate processing system using the fork device and the support table in FIGS. 12A and 12B.
Figure 13B:
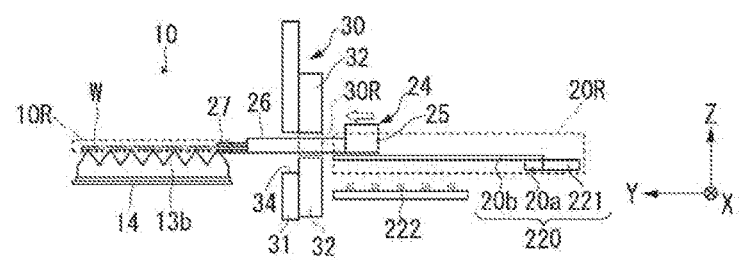
Figure 13C:
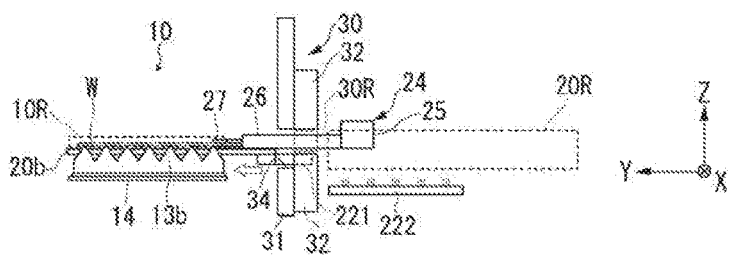

Next, operations of the plate processing system 1 using the fork device 220 and the support table 222 will be described with reference to FIGS. 13A to 13E and FIGS. 14A to 14E. The following description is merely an example, and is not intended to limit the operations. First, as illustrated in FIG. 13A, the workpiece W placed on the palette 13 is carried into the first processing region 10R. Next, as illustrated in FIG. 13B, the transfer device 24 moves in the +Y direction to hold the workpiece W with the workpiece holders 27. In this state, the first processing device 10 performs laser processing on the workpiece W. Next, as illustrated in FIG. 13C, the advance/retract driver 221 is driven to move the fork device 220 from the standby region 20R in the +Y direction, and cause each of the arm portions 20b to enter between the support plates 13b. During the operations illustrated in FIGS. 13A to 13C, the support table 222 is retracted downward to the retracted position.

Figure 13D:
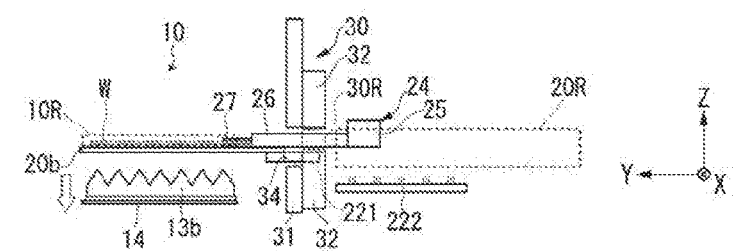
Figure 13E:
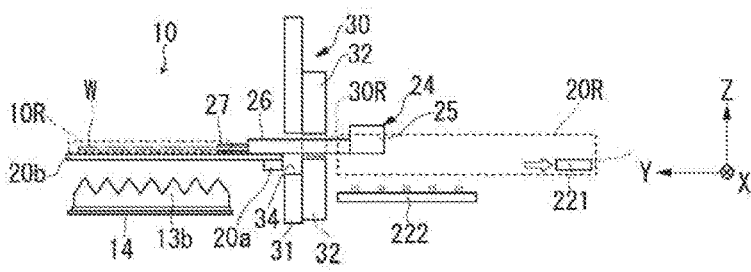

Next, as illustrated in FIG. 13D, the palette 13 on the mounting portion 14 moves downward, and the workpiece W is placed onto the arm portions 20b from the support plates 13b of the palette 13. Next, as illustrated in FIG. 13E, the advance/retract driver 221 is separated from the base portion 20a, moves in the −Y direction, and returns to its original position. At this time, the arm portions 20b are held in the first processing region 10R by a guide or the like (not illustrated), with the workpiece W placed on the arm portions 20b. Upon separation or after separation of the advance/retract driver 221 from the base portion 20a, the arm portions 20b (or the base portion 20a) may be held at a predetermined position in the first processing region 10R with a holder or the like (not illustrated).

Figure 14A:
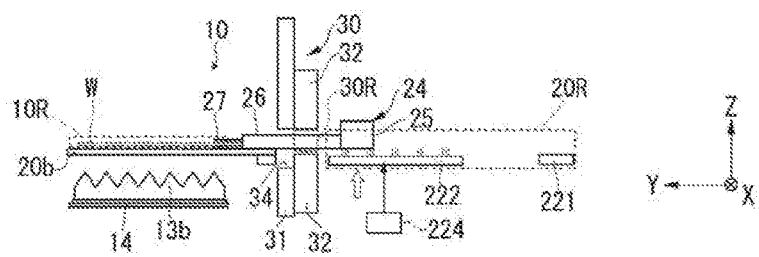
FIGS. 14A to 14E are sectional views illustrating operations of the plate processing system after the operations in FIGS. 13A to 13E.
Figure 14B:
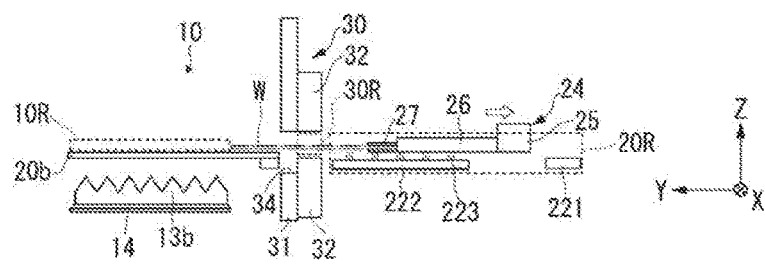

Next, as illustrated in FIG. 14A, the support table 222 is raised to the raised position by the elevator 224 such that its upper surface is flush or substantially flush with the upper surfaces of the arm portions 20b. Next, as illustrated in FIG. 14B, the transfer device 24 moves in the −Y direction. Thus, the workpiece W is transferred in the −Y direction, and a portion of the workpiece W is positioned in the second processing region 30R in the Y direction, and processed by the second processing device 30. The workpiece W is supported by the upper surfaces of the arm portions 20b and the upper ends of the brushes 223 of the support table 222 and thus, the workpiece W is stably transferred. The base portion 20a and the arm portions 20b remain in the first processing region 10R. The second processing device 30 processes the workpiece W in the same manner as described above. Since the upper surfaces of the arm portions 20b are flush or substantially flush with the upper surface (the upper ends of the brushes 223) of the support table 222, there is no level difference, and damage is prevented from being caused on the lower surface of the transferred workpiece W.

Figure 14C:
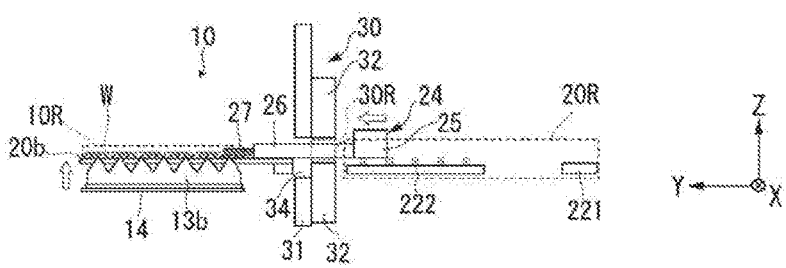
Figure 14D:
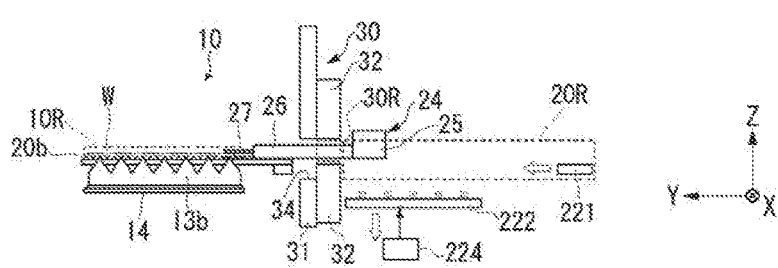

Next, as illustrated in FIG. 14C, the processed workpiece W is transferred to the first processing region 10R by the transfer device 24, and is placed on the arm portions 20b. Subsequently, the palette 13 moves upward, and the workpiece W is placed onto the support plates 13b of the palette 13 from the arm portions 20b. Next, as illustrated in FIG. 14D, the support table 222 is lowered to a retracted position by the elevator 224 and then, the advance/retract driver 221 is moved in the +Y direction.

Figure 14E:
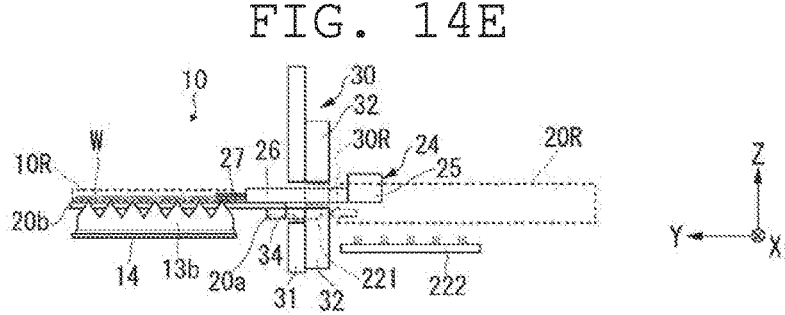

Next, as illustrated in FIG. 14E, the advance/retract driver 221 is coupled to the base portion 20a. Subsequently, although not illustrated, the advance/retract driver 221 is driven to move the base portion 20a and the arm portions 20b to the standby region 20R in the −Y direction. Thereafter, the same operations as those in the above preferred embodiment are performed. That is, the first processing device 10 performs laser processing on the workpiece W, and after the laser processing is finished, the transfer device 24 releases holding of the workpiece W, and returns to the standby region 20R. The palette 13 moves from the first processing region 10R, with the processed workpiece W placed thereon, to carry out the processed workpiece W.

As described above, since the support table 222 retracts downward, the fork device 220 stably advances and retracts without interfering with the support table 222. Further, since the fork device 220 includes the advance/retract driver 221 that is able to be separated from the base portion 20a, even when the base portion 20a or the arm portions 20b remain in the first processing region 10R, the advance/retract driver 221 is able to be separated from the base portion 20a and return. Thus, the driver of the fork device 220 is able to be prevented from entering into the second processing region 30R and interfering with processing of the second processing device 30.

Figure 15:
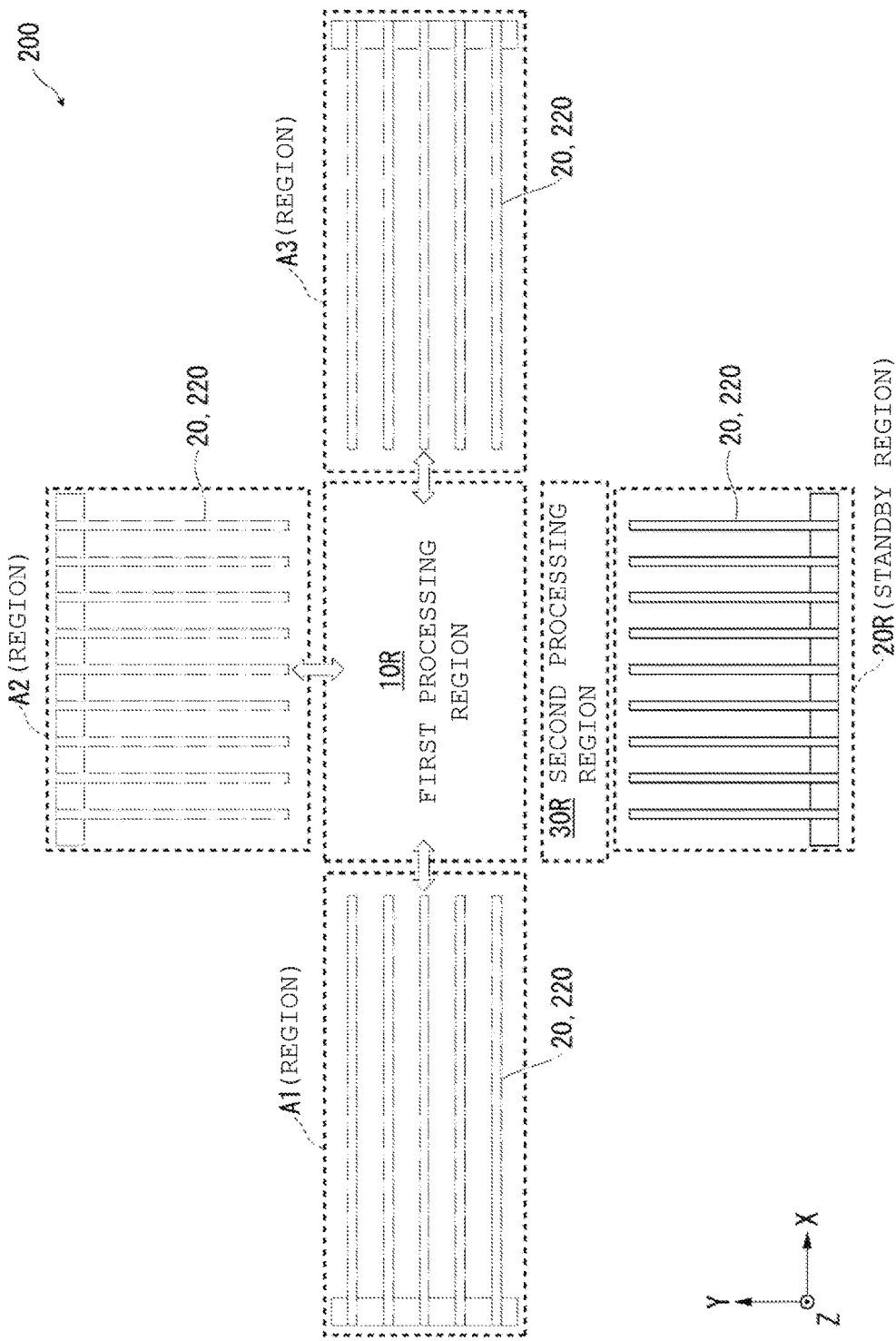
FIG. 15 is a plan view illustrating a plate processing system according to another preferred embodiment of the present invention.

Next, the above-described fork devices 20, 220 (hereinafter referred to as fork device 20 and the like) move from the standby region 20R in the advancing/retracting direction with respect to the first processing region 10R. The standby region 20R is a region opposite to the first processing region 10R across the second processing regions 30R, 130Ra, 130Rb (hereinafter referred to as second processing region 30R and the like). However, the present invention is not limited thereto. FIG. 15 is a plan view illustrating a plate processing system according to another preferred embodiment of the present invention. FIG. 15 illustrates an example in which arrangement of the fork device 20 or the like in a plate processing system 200 is changed. In FIG. 15, reference numerals 130Ra, 130Rb of the second processing regions are omitted.

As illustrated in FIG. 15, the fork device 20 or the like may be disposed in a region A1 located on the −X side of the first processing region 10R, a region A2 located on the +Y side of the first processing region 10R, or a region A3 located on the +X side of the first processing region 10R, and may be moved from the region A1, A2, or A3 in the advancing/retracting direction with respect to the first processing region 10R. The regions A1, A2, and A3 are each a portion of a region surrounding the first processing region 10R. When the fork device 20 or the like is disposed in the region A2, the fork device 20 or the like is reversed in position from the fork device 20 or the like disposed in the standby region 20R. When the fork device 20 or the like is disposed in the regions A1, A3, the length and the number of the arm portions 20b are set according to the shape of the first processing region 10R (the shape of the palette 13).

For example, the fork device 20 or the like may be moved in the advancing/retracting direction from each of the regions A1, A3. When the fork device 20 or the like is moved in the advancing/retracting direction from the regions A1 and A3, the support plates 13b of the palette 13 (see FIG. 2) are arranged in the Y direction in the standing position along the X direction. When the fork device or the like moves from the regions A1, A2, and A3 in the advancing/retracting direction with respect to the first processing region 10R, the transfer device 24 transfers the workpiece W in the first processing region 10R toward the standby region 20R in the −Y direction, and transfers the workpiece W in the standby region 20R toward the first processing region 10R in the +Y direction.

Figure 16A:
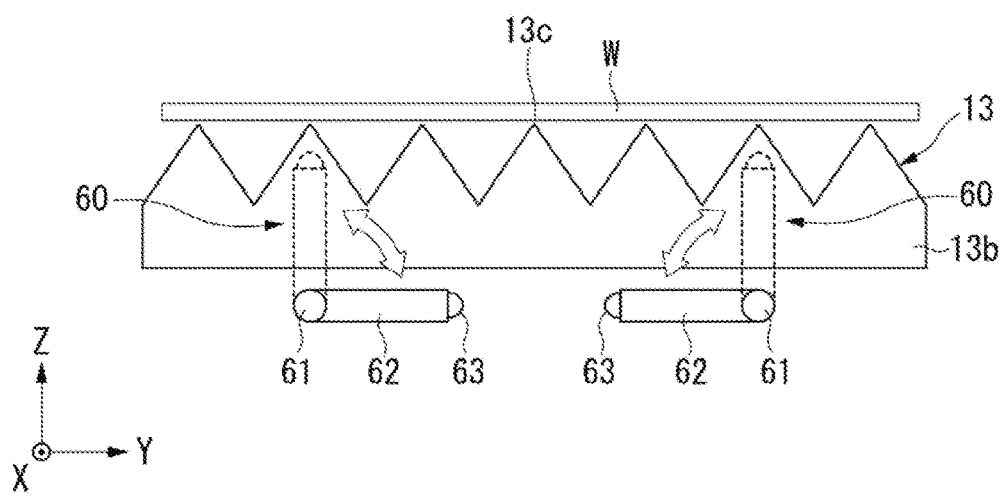
FIGS. 16A and 16B illustrate another example of the support device, where

The support device is not limited to the fork device 20 or the like. FIGS. 16A and 16B and FIGS. 17A and 17B each illustrate another example of the support device, FIG. 17A illustrates a state before the workpiece is supported, and FIG. 17B illustrates a state after the workpiece is supported. As illustrated in FIG. 16A, the support devices 60 each include a shaft 61, a rod portion 62 that is able to rotate about the shaft 61, and a free ball bearing 63 provided at a front end of the rod portion 62. Although the support devices 60 are provided at two positions in FIGS. 16A and 16B, the support devices may be provided at predetermined intervals, and any number of support devices may be arranged.

For example, the shafts 61 are provided on the mounting portion 14 on which the palette 13 is placed (see FIG. 2). As illustrated in FIG. 16A, the rod portions 62 are each rotated from a fallen state to a standing state by a driver (not illustrated). Each of the rod portions 62 stands while being located between the support plates 13b of the palette 13. A ball of the free ball bearing 63 is able to rotate with respect to the rod portion 62. The operations of the support devices 60 may be controlled by the controller 50 (see FIG. 1), for example.

Figure 16B:
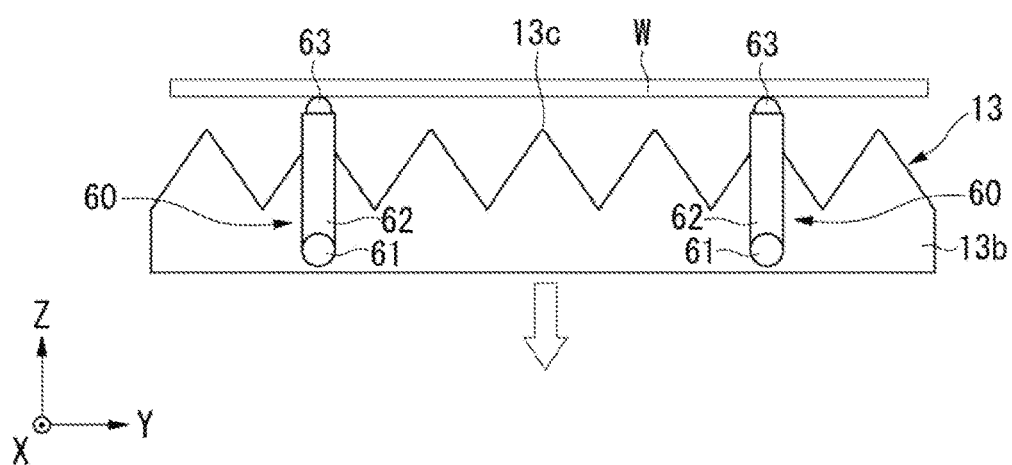
Figure 17A:
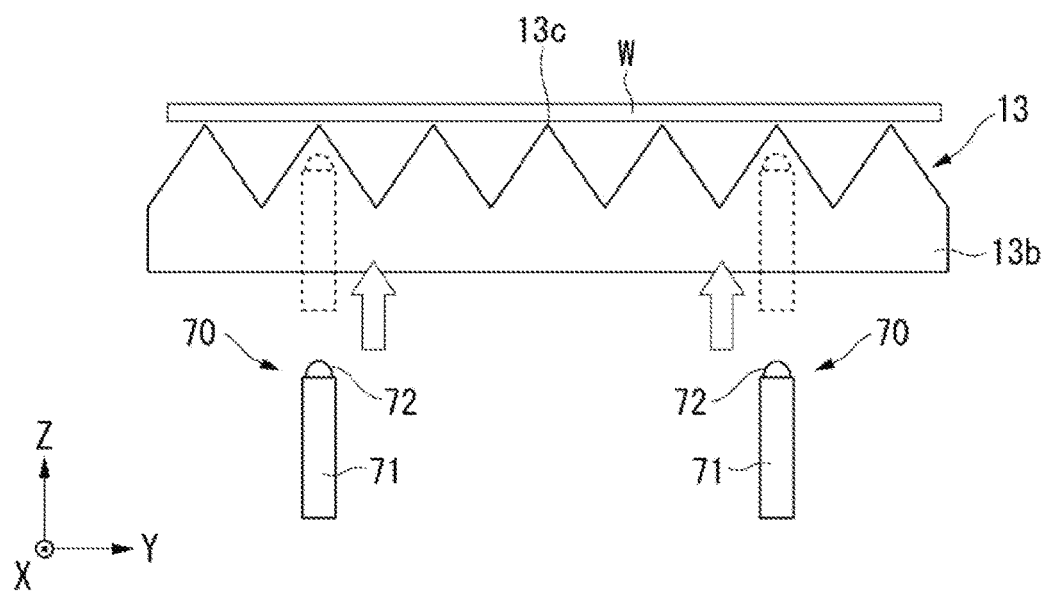
FIGS. 17A and 17B illustrate another example of the support device, where
Figure 17B:
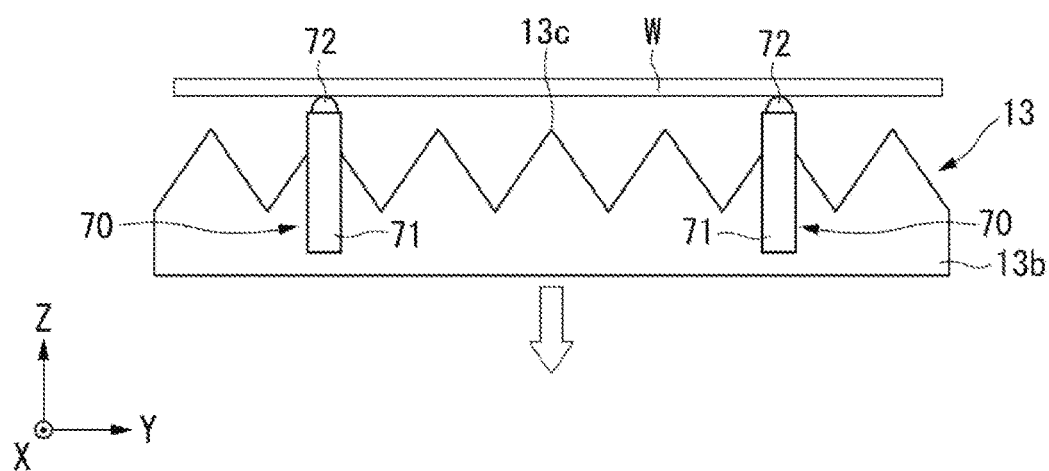

By moving the palette 13 downward with the rod portions 62 in the standing state, as illustrated in FIG. 16B, the workpiece W placed on the upper ends 13c of the support plates 13b is transferred onto the free ball bearings 63. Instead of moving the palette 13 downward, the workpiece W may be transferred onto the free ball bearings 63 by moving the support devices 60 upward. In this state, the transfer device 24 transfers the workpiece W. Since the workpiece W is placed on the free ball bearing 63 at this time, moving the workpiece W rotates balls of the free ball bearings 63, and thus the workpiece W is stably transferred without any damage. Instead of the free ball bearing 63, a brush may be provided at a front end of the rod portion 62.

Next, as illustrated in FIG. 17A, support devices 70 each include a rod portion 71 and a free ball bearing 72 provided at a front end of the rod portion 71. Although the support devices 70 are provided at two positions in FIGS. 17A and 17B, a plurality of support devices may be disposed at predetermined intervals, and any number of support devices may be provided. For example, the rod portions 71 are supported by the mounting portion 14 (see FIG. 2) on which the palette 13 is placed. As illustrated in FIG. 17A, the rod portions 71 are moved upward from a stored state by a driver (not illustrated). The rod portions 71 each move upward while being located between the support plates 13b of the palette 13. The ball of the free ball bearing 72 rotates with respect to the rod portion 71. The operations of the support devices 70 may be controlled by the controller 50 (see FIG. 1).

By moving the palette 13 downward in the state where the rod portions 71 are moved upward, as illustrated in FIG. 17B, the workpiece W placed on the upper ends 13c of the support plates 13b is transferred onto the free ball bearings 72. Instead of moving the palette 13 downward, the workpiece W may be transferred onto the free ball bearings 72 by moving the support devices 70 upward. In this state, the transfer device 24 transfers the workpiece W. At this time, similar to the support devices 60 illustrated in FIGS. 16A and 16B, the workpiece W is placed on the free ball bearings 72. Thus, by rotating balls of the free ball bearings 72, the workpiece W is stably transferred without any damage. Instead of the free ball bearing 72, a brush may be provided at the front end of the rod portion 71.

Instead of using the rod portion 71, the support devices 70 each may be telescopically constructed by sequentially inserting a plurality of tubular bodies so as to be extendable in the vertical direction. In this case, the rod portions 71 are able to be extended by a driver (not illustrated) to transfer the workpiece W. Instead of being provided on the mounting portion 14 on which the palette 13 is placed, the support devices 70 may be provided on the palette 13.

Figure 18A:
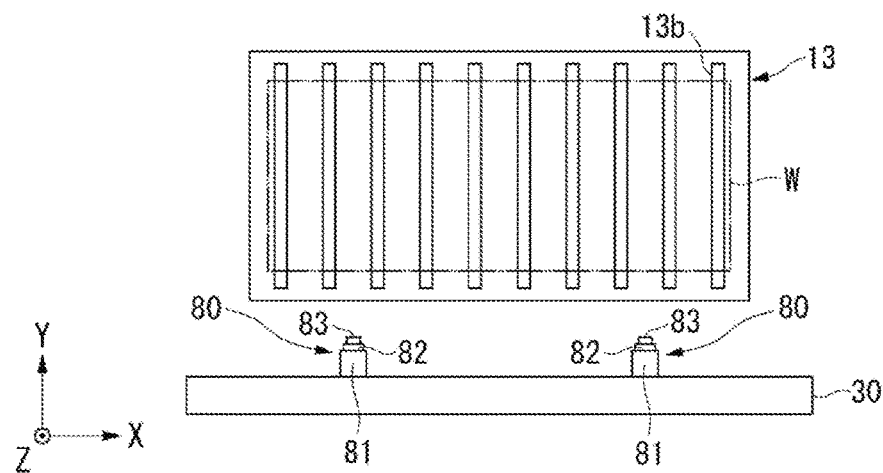
FIGS. 18A to 18C illustrate another example of the support device, where
Figure 18B:
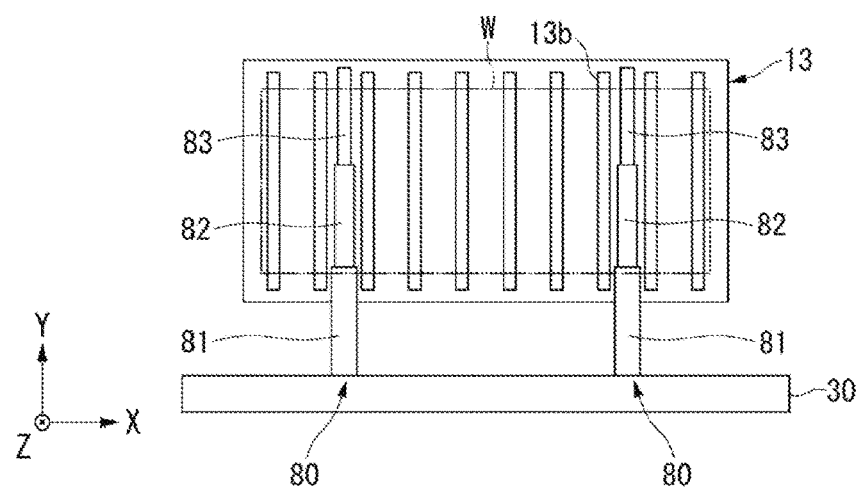
Figure 18C:
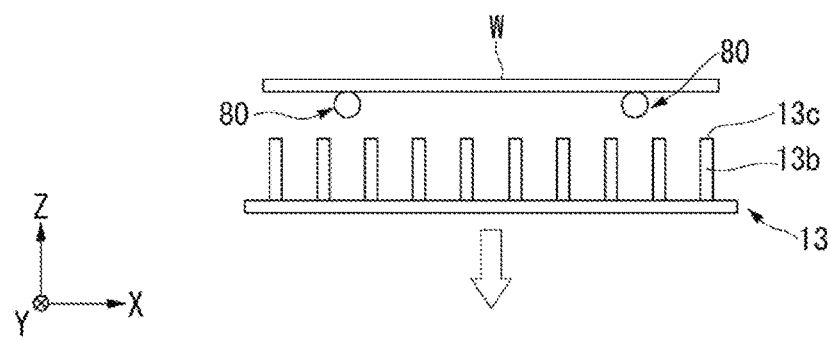

The support device does not necessarily move in the vertical direction. FIGS. 18A to 18C illustrates another example of the support device, FIG. 18A illustrates the state before the workpiece is supported, FIG. 18B illustrates preparation for supporting the workpiece, and FIG. 18C illustrates the state after the workpiece is supported. As illustrated in FIGS. 18A and 18B, support devices 80 are each telescopically constructed by sequentially inserting a plurality of tubular bodies 81, 82, and 83 so as to be extendable. The number of tubular bodies may be any number, i.e., two or four or more. For example, the support devices 80 are provided in the second processing device 30, and are extendable in the +Y direction. Instead of being disposed on the second processing device 30, the support devices 80 may be disposed on the +X side, the –X side, or the +Y side of the palette 13 (the first processing region 10R not illustrated in FIGS. 18A to 18C).

Extension/contraction of the support devices 80 (movement of the tubular bodies 81, 82, and 83) is performed by a driver (not illustrated). The operations of the support devices 80 may be controlled by the controller 50 (see FIG. 1), for example. The sectional shape of each of the tubular bodies 81, 82, and 83 is not limited to a circle, and may be an ellipse, an oval, or a polygon such as a rectangle. A free ball bearing or a brush may be provided on an upper surface of each of the tubular bodies 81, 82, and 83. Although the support devices 80 are provided at two positions in FIG. 18, a plurality of support devices may be provided at predetermined intervals, and any number of support devices may be arranged.

As illustrated in FIG. 18A, in the state where the support devices 80 are contracted, the tubular bodies 81, 82, and 83 are retracted in the –Y direction so as not to interfere with movement of the palette 13. The tubular bodies 81, 82, and 83 are moved in the +Y direction by a driver (not illustrated), and as illustrated in FIG. 18B, extend while being located between the support plates 13b of the palette 13. By moving the palette 13 downward in this state, as illustrated in FIG. 18C, the workpiece W placed on the upper ends 13c of the support plates 13b is transferred onto the tubular bodies 81, 82, and 83. Instead of moving the palette 13 downward, the workpiece W may be transferred onto the tubular body 81 and the like by moving the support devices 80 upward. In this state, the transfer device 24 transfers the workpiece W.

Although the support devices 60, 70, and 80 are described as examples of the support device, the support device is not limited to these examples. Any mechanism that can transfer the workpiece W from the support plates 13b of the palette 13 may be used as the support device.

Figure 19A:
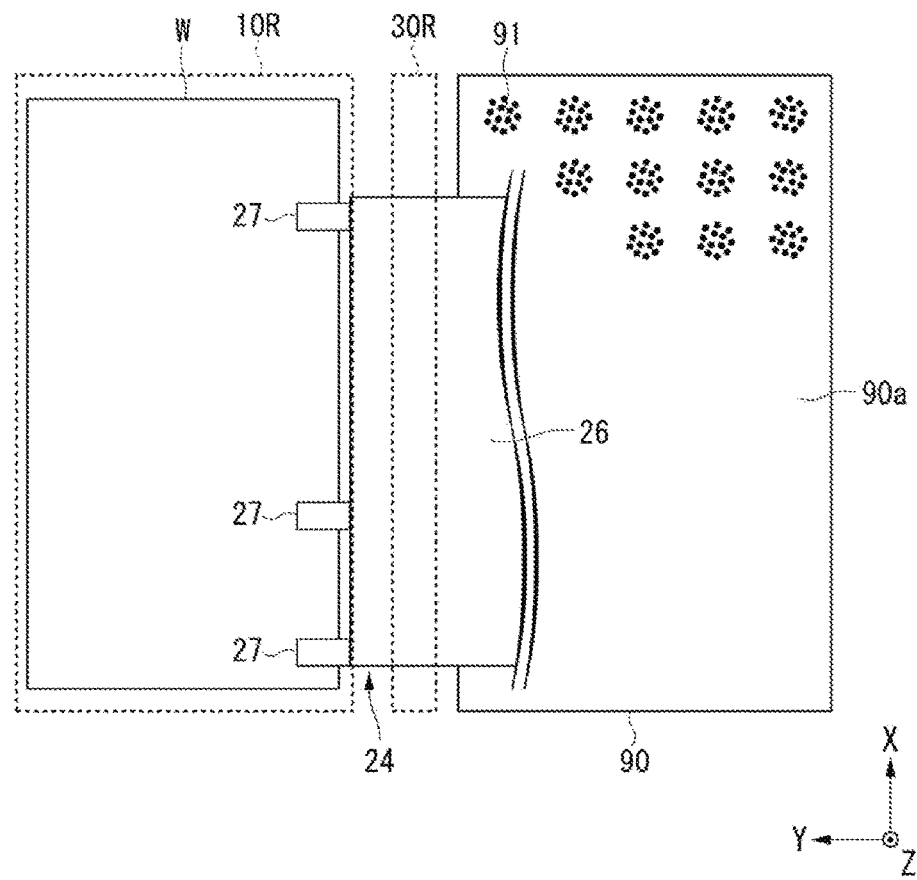
FIGS. 19A and 19B illustrate an example in which the transfer device holds the workpiece supported by the support device, where
Figure 19B:
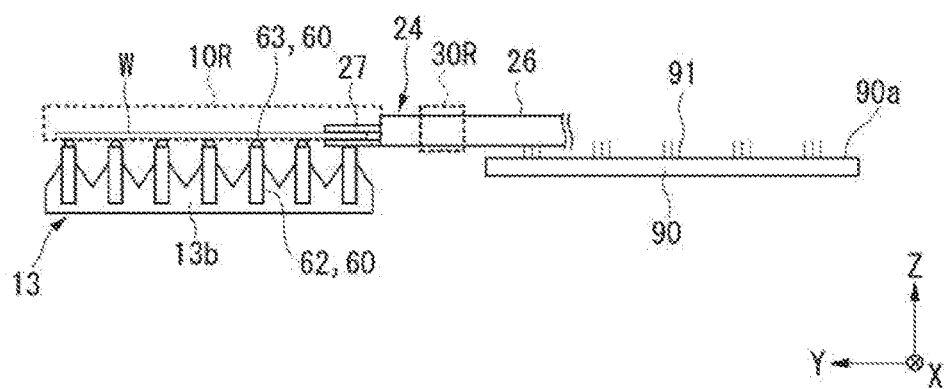

FIGS. 19A and 19B illustrate an example in which the workpiece supported by the support device is held by the transfer device, where FIG. 19A is a plan view, and FIG. 19B is a side view. Although FIGS. 19A and 19B and FIGS. 20A and 20B illustrate the support devices 60 in FIGS. 16A and 16B, the support devices 70, 80 illustrated in FIGS. 17A and 17B and FIGS. 18A to 18C may be used. In FIGS. 19A and 19B and FIGS. 20A and 20B, the shafts 61 of the support device 60 are omitted. As illustrated in FIGS. 19A and 19B, a table 90 on which the workpiece W transferred by the transfer device 24 is provided opposite to the first processing region 10R across the second processing region 30R. A front surface 90a of the table 90 include a plurality of brushes 91 at predetermined intervals. Free ball bearings may be provided instead of the brushes 91.

As illustrated in FIG. 19B, upper ends of the brushes 91 are flush or substantially flush with the upper ends of the free ball bearings 63 of the support devices 60. The transfer device 24 moves on the table 90 in the +Y direction, and holds a −Y side end of the workpiece W with the plurality of workpiece holders 27 of the plate 26.

Figure 20A:
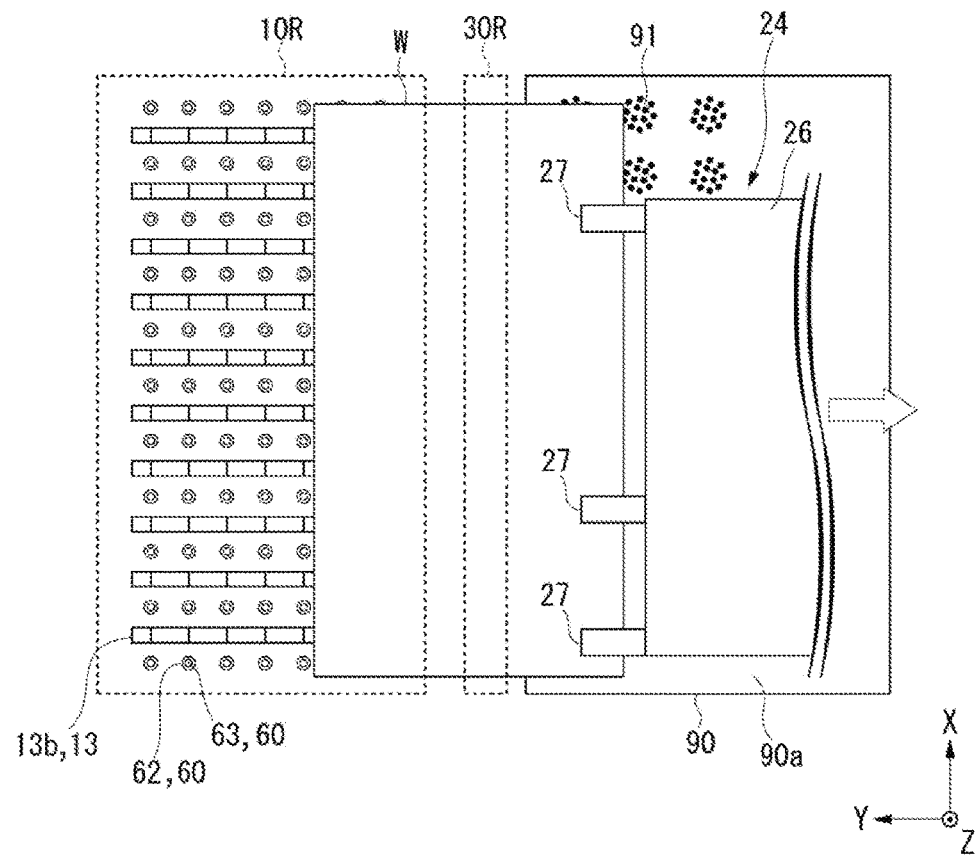
FIGS. 20A and 20B illustrate an example in which the transfer device transfers the workpiece, where
Figure 20B:
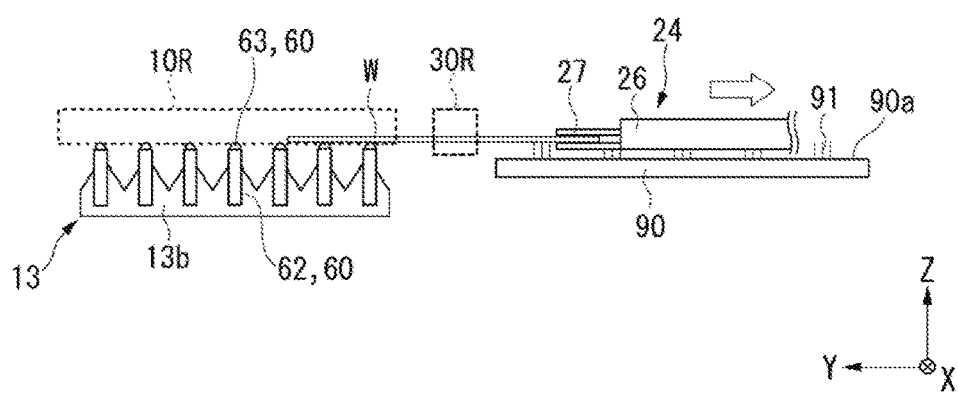

The workpiece W is transferred in the −Y direction by moving the transfer device 24 in the −Y direction in the state where the workpiece W is held by the workpiece holders 27. FIGS. 20A and 20B illustrate an example in which the workpiece W is transferred by the transfer device 24, where FIG. 20A is a plan view, and FIG. 20B is a side view. As illustrated in FIGS. 20A and 20B, the workpiece W placed on the brushes 91 of the table 90 is transferred while being supported by the support devices 60. As described above, a portion of the workpiece W is able to be positioned in the second processing region 30R and processed by the second processing device 30 (see FIG. 1 and the like).

When the second processing device 30 finishes processing of the workpiece W, for example, the transfer device 24 may move the workpiece W in the +Y direction, and as illustrated in FIGS. 19A and 19B, the support devices 60 may support the workpiece W. Thereafter, by raising the palette 13 to pass the workpiece W from the support devices 60 to the support plates 13b, the workpiece W placed on the palette 13 is be carried out. Transfer of the workpiece W onto the palette 13 is optional, and the workpiece W may be transferred from the table 90 to another place, or a product may be picked up from the workpiece W on the table 90.

Although the preferred embodiments have been described, the present invention is not limited to the above description, and may be modified in any manner so as not to deviate from the gist of the present invention. The elements or features of the preferred embodiments can be combined with each other as appropriate. For example, although the upper tools 37 and the lower tools 38 preferably are held by the upper-tool support block 39 and the lower-tool support block 40, respectively, in the above preferred embodiments, the present invention is not limited thereto. For example, each of the upper tools 37 and the lower tools 38 may be held by a disc-shaped turret, and the turrets may be moved along the guides 33 in the X direction.

Although the forming head 40b preferably is disposed in the lower-tool support block 40 in the above preferred embodiment, the present invention is not limited thereto. For example, the forming head 40b may be disposed below the lower-tool support block 40, and may be movable along a guide or the like separately from the lower-tool support block 40.

Although the workpiece W preferably is carried in and out on the palette 13 in the above preferred embodiment, the present invention is not limited thereto. For example, the workpiece W may be carried into the first processing region 10R by a loader capable of transferring the workpiece W. In this case, the first processing region 10R is provided with a support portion corresponding to the support plates 13b. Although the processed workpiece W is carried out of the first processing region 10R on the palette 13, the present invention is not limited thereto, and a product may be picked up from the workpiece W in the first processing region 10R.

Although the tap tool 36 is located on the −X side of the press tool 35 in the above preferred embodiments, the tap tool 36 may be disposed on the +X side of the press tool 35, or on both of the +X side and the −X side of the press tool 35.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A plate processing system comprising:
   a first processing device including a laser head that moves relatively with respect to a plate-shaped workpiece in a first processing region to cut the workpiece;
   a support device including a plurality of arms that support the workpiece in the first processing region;
   a transfer device including a carriage and workpiece holders that hold and transfer the workpiece supported by the support device;
   a second processing device including a processing tool that moves in a direction intersecting a transfer direction of the workpiece in a second processing region and processes the workpiece, the second processing region being located in a portion of a transfer path of the workpiece transferred by the transfer device; and
   a palette disposed in the first processing region and including a plurality of upper ends that support a lower surface of the workpiece; wherein
   the support device separates the workpiece from the plurality of upper ends of the palette;
   the transfer device holds the workpiece with the workpiece holders when the laser head cuts the workpiece;
   the transfer device transfers the workpiece, which has been separated from the plurality of upper ends of the palette by the support device, to the second processing device after the laser head cuts the workpiece; and
   the second processing device includes a frame including an opening through which the workpiece, the support device, and a portion of the transfer device pass.

2. The plate processing system according to claim 1, further comprising a table located opposite to the first processing region across the second processing region, the table on which the workpiece transferred by the transfer device is placed; wherein
   the transfer device transfers the workpiece placed on one or both of the support device and the table.

3. The plate processing system according to claim 2, wherein
   the palette is movable; and
   the support device moves relative to the palette to raise and support the workpiece.

4. The plate processing system according to claim 3, wherein
   the support device is a fork device including the plurality of arms that advance/retract with respect to the first processing region from a standby region partially surrounding the first processing region, the plurality of arms on which the workpiece is placed.

5. The plate processing system according to claim 4, wherein
   the fork device advances/retracts with respect to the first processing region from the standby region and through the second processing region; and
   the transfer device transfers the workpiece in an advancing/retracting direction of the plurality of arms.

6. The plate processing system according to claim 5, wherein the second processing device includes a guide provided on the frame and that moves the processing tool in the intersecting direction.

7. The plate processing system according to claim 6, wherein the guide includes an upper guide and a lower guide which are located on opposite sides of the opening; and the processing tool includes an upper-tool support block that moves along the upper guide and holds a plurality of upper tools, a lower-tool support block that moves along the lower guide and holds a plurality of lower tools, and a forming head that selects and uses any of the plurality of upper tools and the plurality of lower tools.

8. The plate processing system according to claim 7, wherein the plurality of upper tools and the plurality of lower tools are arranged parallel to the intersecting direction.

9. The plate processing system according to claim 8, wherein the upper-tool support block and the lower-tool support block move in synchronization with each other.

10. The plate processing system according to claim 9, wherein the forming head is movable along the upper guide or the lower guide, or is movable along a selection guide on the upper-tool support block or the lower-tool support block.

11. The plate processing system according to claim 10, wherein the second processing device includes a position detector that detects a position of the processing tool in the intersecting direction.

12. The plate processing system according to claim 11, further comprising a fixing table in the standby region, the fixing table including a plurality of rod portions which are alternately disposed with the plurality of arms of the fork device and extend in the advancing/retracting direction.

13. The plate processing system according to claim 12, wherein upper surfaces of the plurality of arms of the fork device are flush with upper surfaces of the rod portions of the fixing table.

14. The plate processing system according to claim 4, further comprising a support table in the standby region that supports the workpiece on an upper surface and retracts downward; wherein the fork device includes an advance/retract driver which is capable of advancing/retracting with respect to the first processing region when the support table retracts, and capable of being separated from the plurality of arms.

15. The plate processing system according to claim 1, wherein the support device is extendable upward in the first processing region or rotatable to a standing position, to support the workpiece.

16. The plate processing system according to claim 1, wherein the support device is horizontally extendable from a periphery of the first processing region toward the first processing region, to support the workpiece.

17. A plate processing method of processing a plate-shaped workpiece, the method comprising:

relatively moving the workpiece and a laser head in a first processing region to cut the workpiece with the laser head;

supporting the workpiece in the first processing region;

holding and transferring the supported workpiece;

moving a processing tool in a direction intersecting a transfer direction of the workpiece in a second processing region to process the workpiece, the second processing region being located in a portion of a transfer path of the workpiece;

disposing a palette that includes a plurality of upper ends in the first processing region;

placing a lower surface of the workpiece on the plurality of upper ends of the palette;

separating the workpiece from the plurality of upper ends of the palette using a support device that includes a plurality of arms that support the workpiece in the first processing region;

holding the workpiece with a transfer device when the laser head cuts the workpiece, the transfer device including a carriage and workpiece holders that hold and transfer the workpiece supported by the support device; and using the transfer device to transfer the workpiece, which has been separated from the plurality of upper ends of the palette by the support device, to the second processing region after the laser head cuts the workpiece.

* * * * *